April 11, 1944.   C. A. BREWER   2,346,149
SAFETY CONTROL SYSTEM FOR MOTOR VEHICLES
Filed Oct. 2, 1929   9 Sheets-Sheet 1

Inventor
Charles A. Brewer
By Wooster & Davis
Attorneys

April 11, 1944.    C. A. BREWER    2,346,149
SAFETY CONTROL SYSTEM FOR MOTOR VEHICLES
Filed Oct. 2, 1929    9 Sheets-Sheet 2
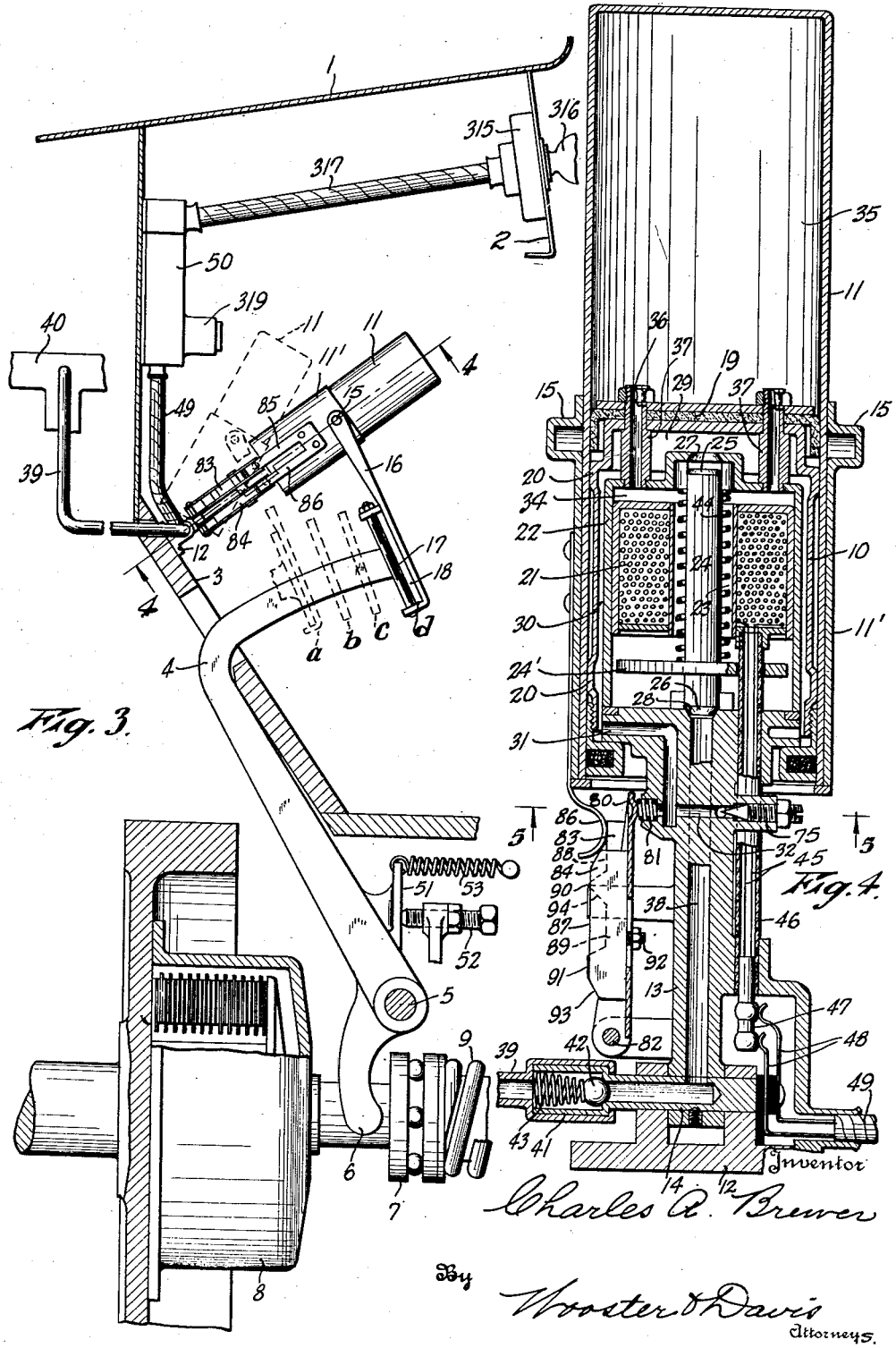
Inventor
Charles A. Brewer
By Wooster & Davis
Attorneys.

April 11, 1944. C. A. BREWER 2,346,149
SAFETY CONTROL SYSTEM FOR MOTOR VEHICLES
Filed Oct. 2, 1929 9 Sheets-Sheet 3
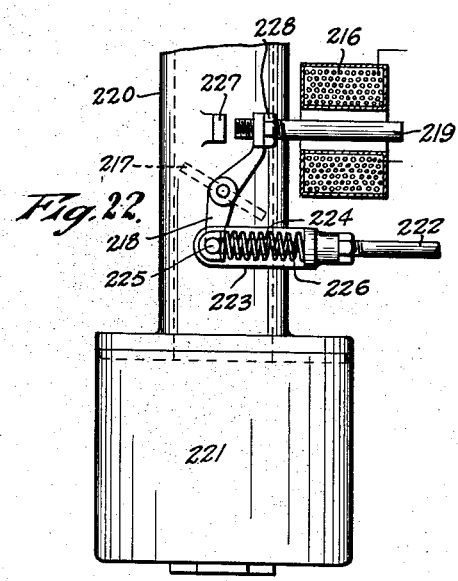
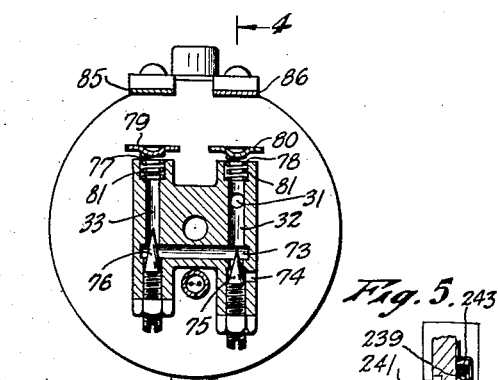
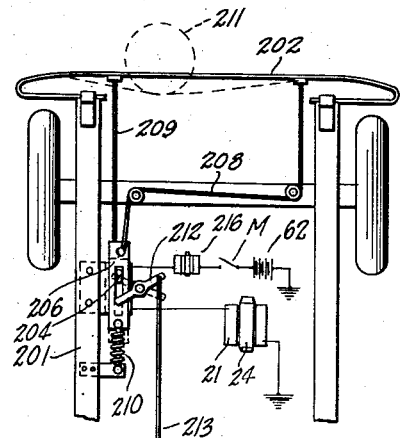
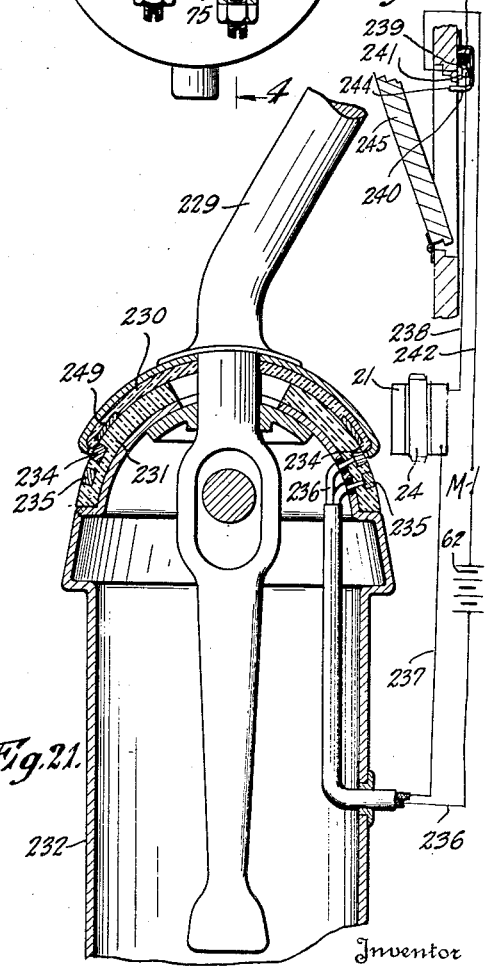
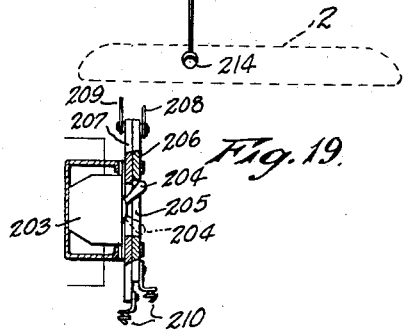
Inventor
Charles A. Brewer
By Wooster & Davis
Attorneys April 11, 1944.   C. A. BREWER   2,346,149
SAFETY CONTROL SYSTEM FOR MOTOR VEHICLES
Filed Oct. 2, 1929   9 Sheets-Sheet 4
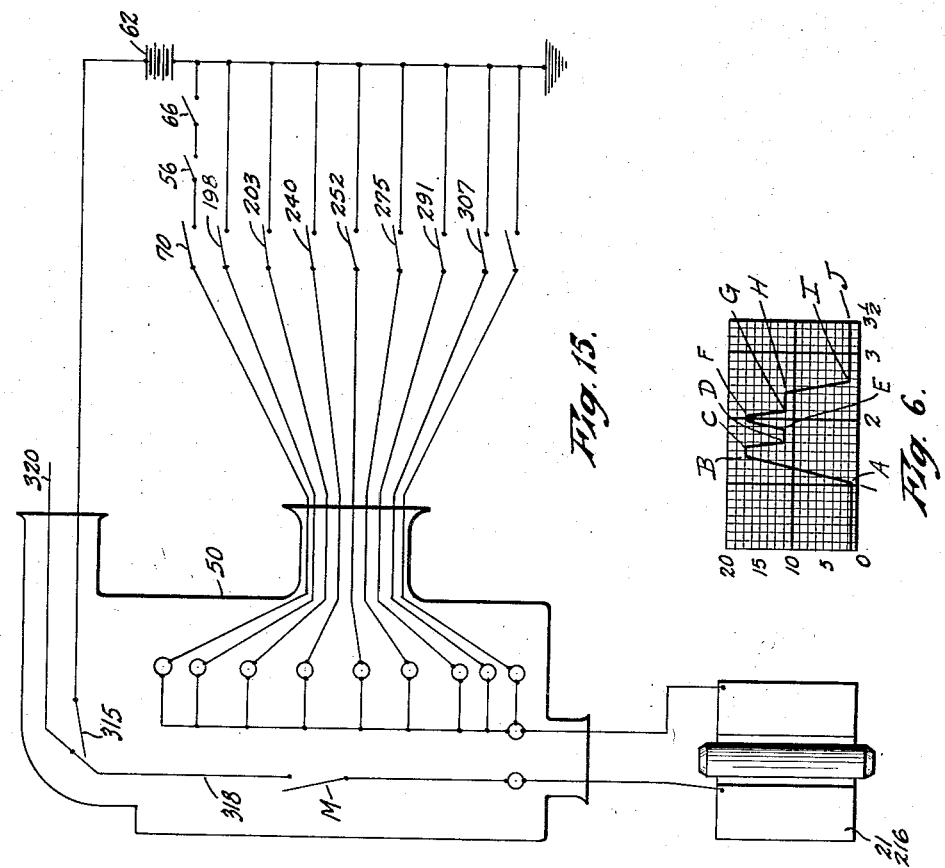
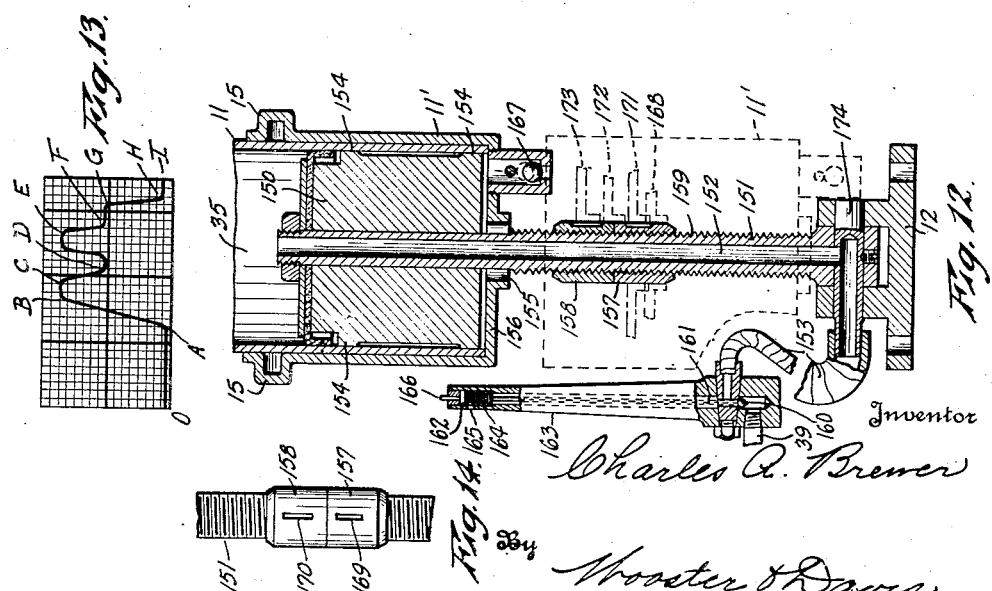
Inventor
Charles A. Brewer
By Wooster & Davis
Attorneys.

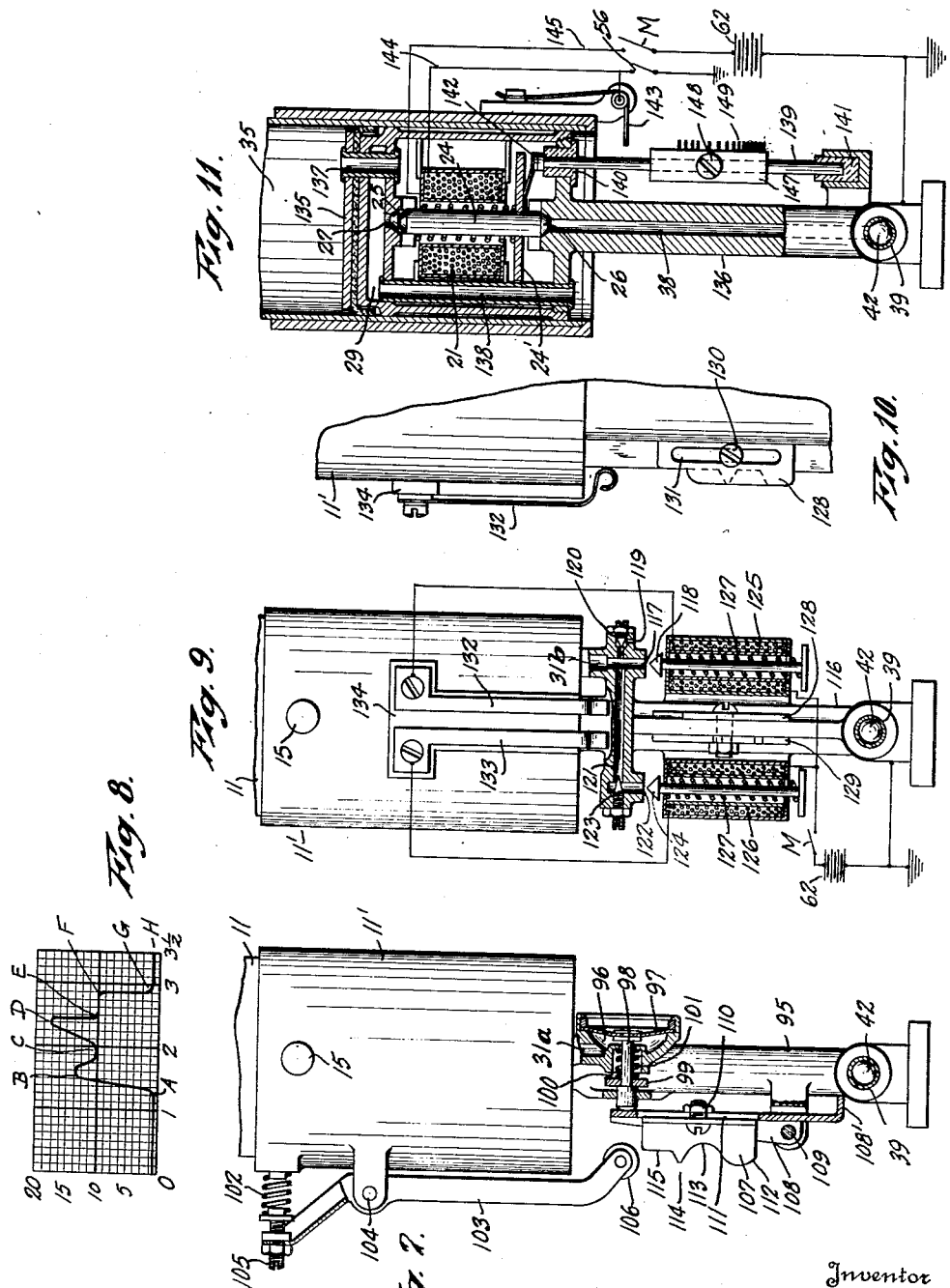

April 11, 1944.     C. A. BREWER     2,346,149
SAFETY CONTROL SYSTEM FOR MOTOR VEHICLES
Filed Oct. 2, 1929     9 Sheets-Sheet 6
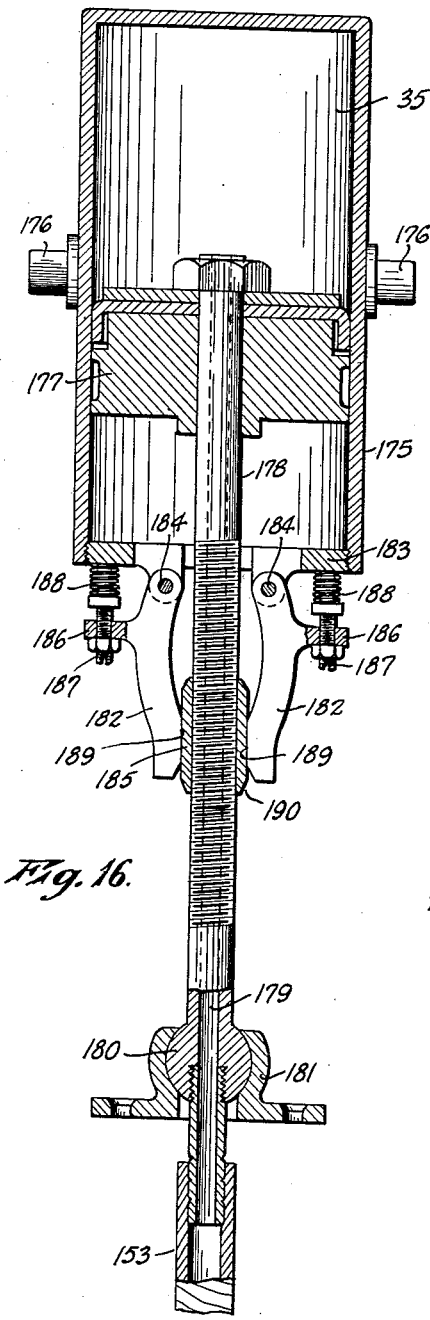
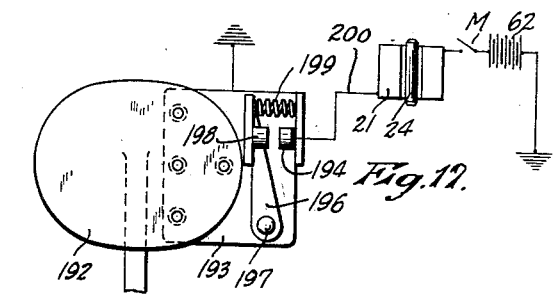
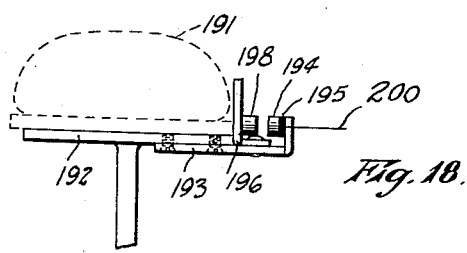
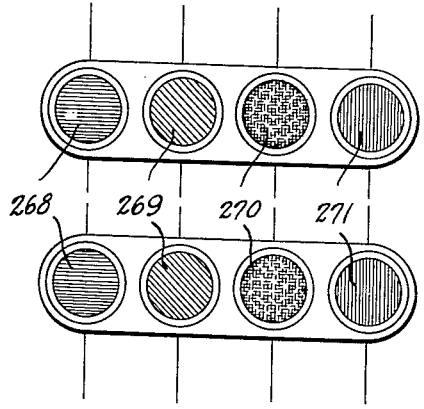
Inventor
Charles A. Brewer
By Wooster & Davis
Attorneys April 11, 1944. C. A. BREWER 2,346,149
SAFETY CONTROL SYSTEM FOR MOTOR VEHICLES
Filed Oct. 2, 1929 9 Sheets-Sheet 7
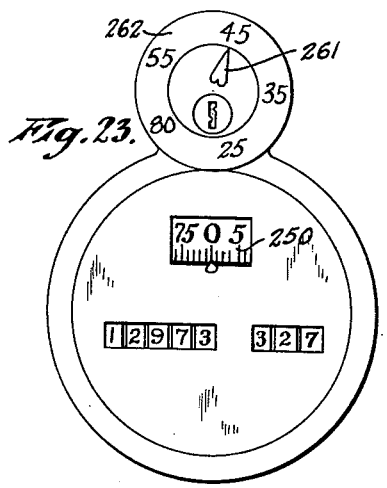
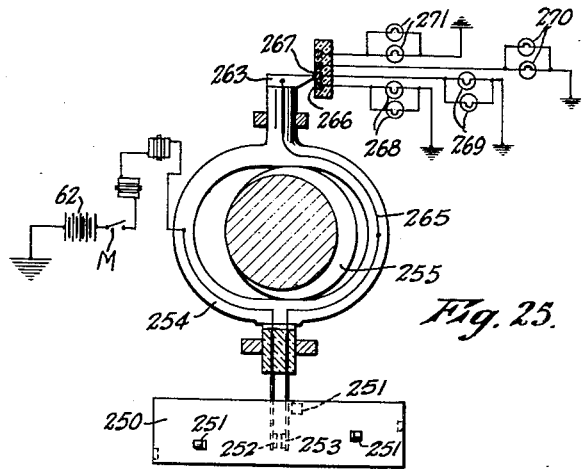
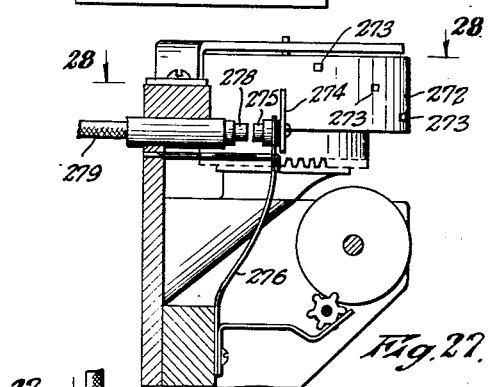
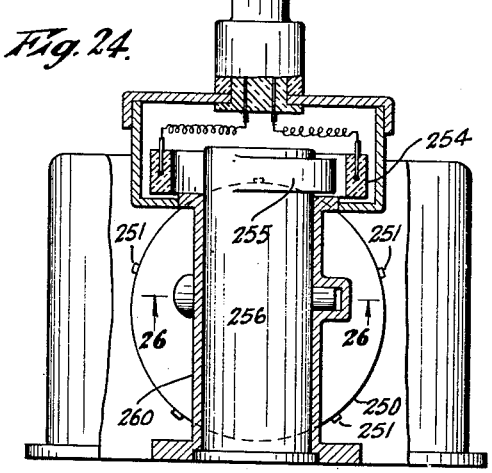
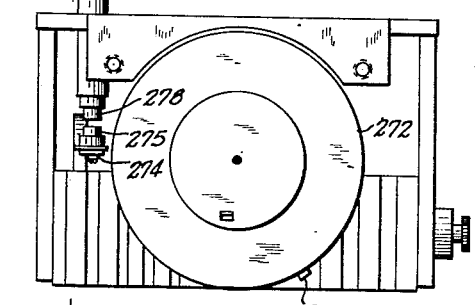
Inventor
Charles A. Brewer
By Wooster & Davis
Attorneys April 11, 1944.   C. A. BREWER   2,346,149
SAFETY CONTROL SYSTEM FOR MOTOR VEHICLES
Filed Oct. 2, 1929   9 Sheets-Sheet 8
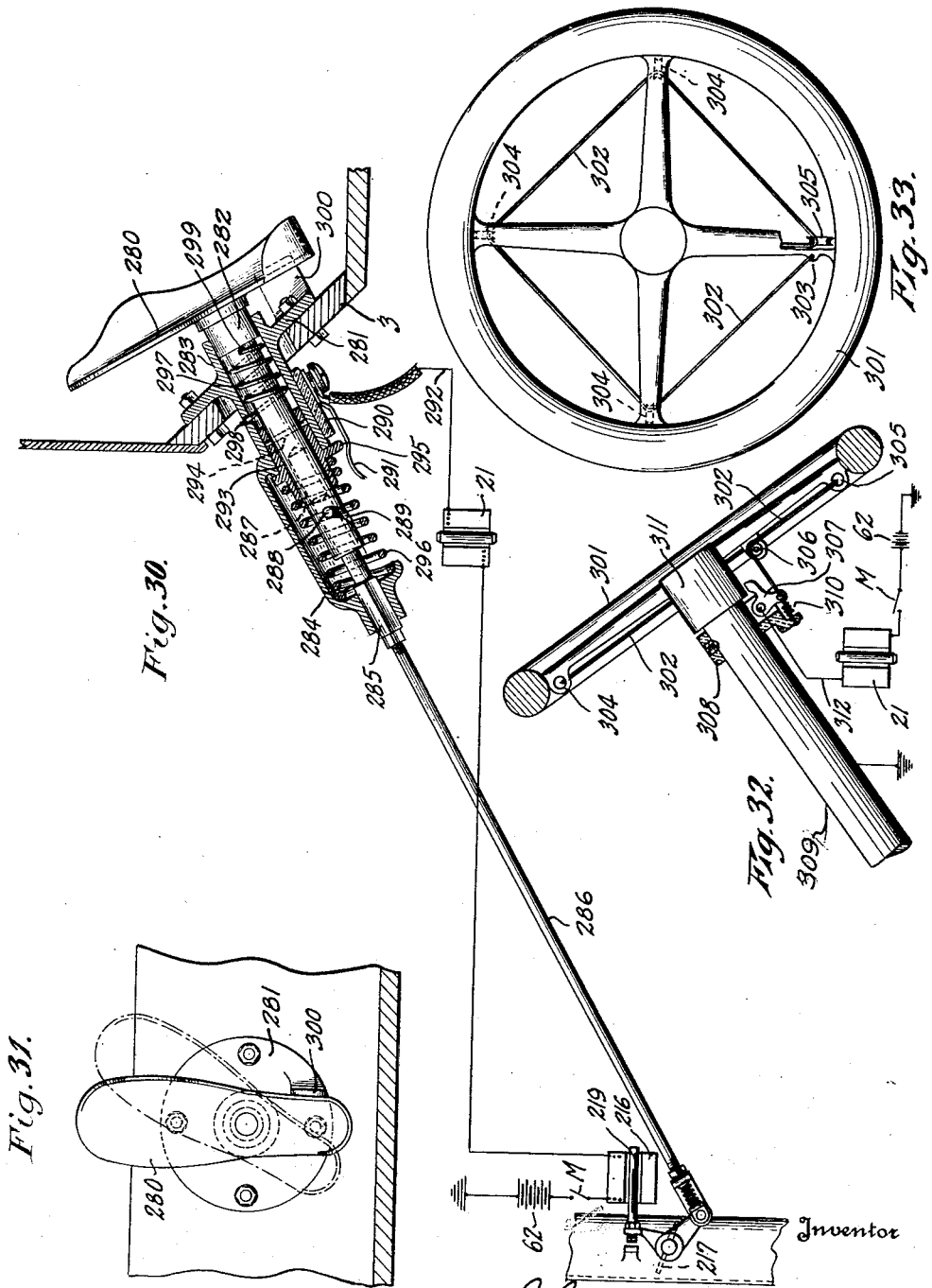

April 11, 1944.　　　C. A. BREWER　　　2,346,149
SAFETY CONTROL SYSTEM FOR MOTOR VEHICLES
Filed Oct. 2, 1929　　　9 Sheets-Sheet 9
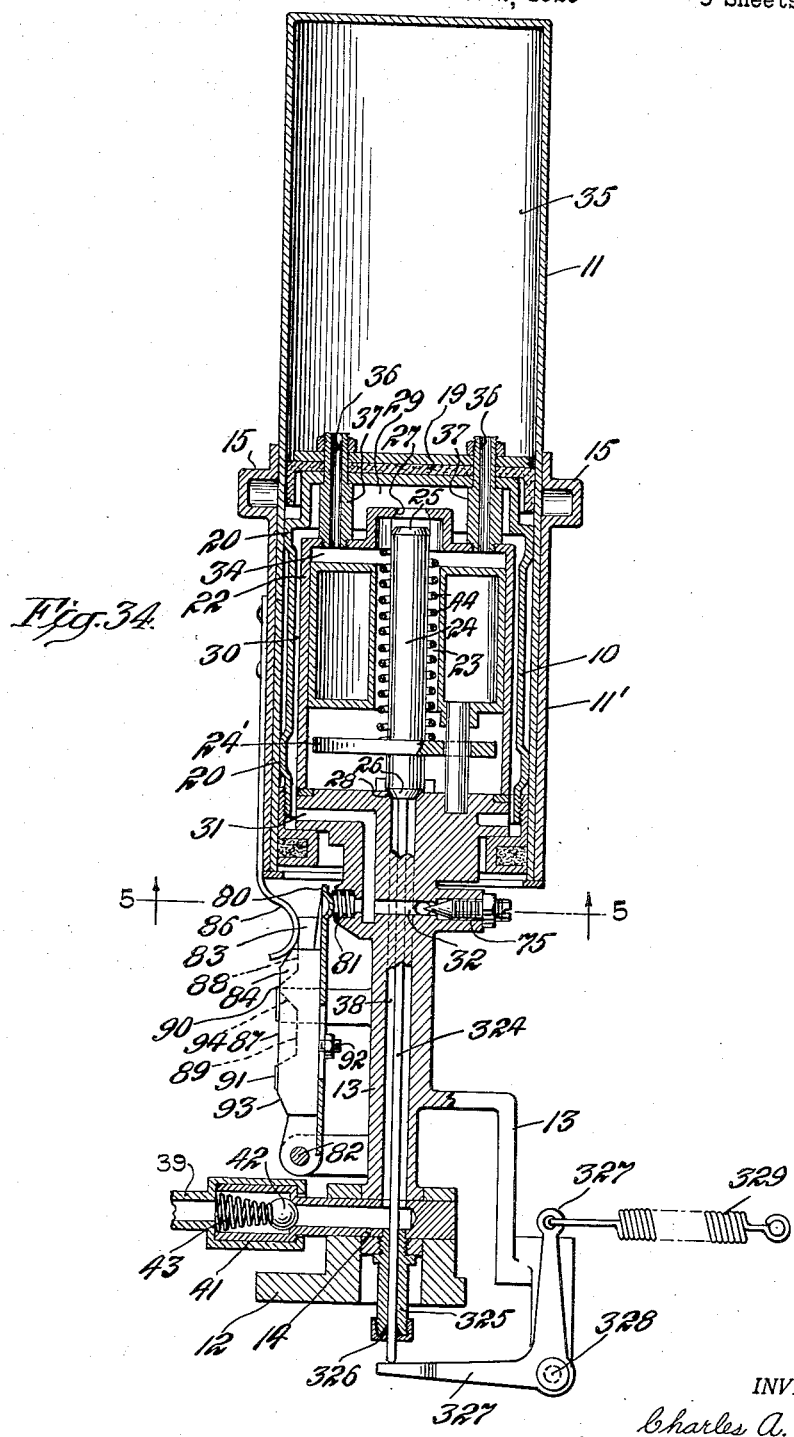
INVENTOR.
Charles A. Brewer
BY
F. Bascom Smith
ATTORNEY Patented Apr. 11, 1944

2,346,149

UNITED STATES PATENT OFFICE 2,346,149

SAFETY CONTROL SYSTEM FOR MOTOR VEHICLES

Charles A. Brewer, Noroton Heights, N. Y., assignor of one-half to Philip J. Kury, Arverne, N. Y.

Application October 2, 1929, Serial No. 396,691

68 Claims. (Cl. 192—.01)

This invention relates to motor vehicles, and more particularly to a safety control system for controlling the operation of a motor vehicle to reduce the large number of accidents, and to provide safety in operation and a more uniform and easier control of the vehicle than is now possible with the ordinary constructions.

It is a particular object of the invention to provide an improved operating and control means for a clutch, and one which may be operated from a large number of separate controls to reduce the danger from accidents and injury in case of an accident, to reduce wear on the vehicle and the various operating mechanisms thereof, and also to tend to smooth out the operation and control of the vehicle to reduce starting strains and fatigue to the passengers.

It is also an object of the invention to provide an improved power control device for the clutch in which no effort is required on the part of the driver in releasing the clutch, and in which there is means for so controlling the operation of the device that the device automatically duplicates expert foot operation of the clutch when letting it into engagement. In other words, there is automatic timed clutch engagement providing a positive uniform control of the clutch driving effort during the engaging period of the clutch equal to expert foot operation and depending on the effort required in view of the driving conditions and the condition or movement of the vehicle, that is, a balancing of the driving effort of the clutch with the inerita of the vehicle during the engaging period or movement of the clutch. Or stated in another way, there is an automatic control of the starting effort of the driven member of the clutch in relation to the uniform linear acceleration of the vehicle, which thus tends for more uniform and easy operation of the vehicle during its starting and in getting up speed, with less injury and strain to the mechanism, chassis and other parts of the vehicle and with less fatigue to the operator and passengers thereof.

It is also an object of the invention to so control the clutch and the emergency brake operating control that when the emergency brake is applied on a car on an up grade, the clutch is automatically released, but as soon as the emergency brake is released, the clutch is placed in engagement to prevent backward rolling of the car and insure immediate starting forward as soon as the emergency brake is released. This prevents back roll of the car and acts as a back lock when starting the car on an up grade and insures uniform operation, while the automatic control of the clutch engagement insures a proper and uniform starting and acceleration of the vehicle and prevents stalling of the motor.

It is a further object to provide means whereby the automatic release of the clutch is eliminated in applying the emergency brake on a down grade so that the compression of the motor as well as the emergency brake may be used as a braking means on a car on a down grade.

Another object of the invention is to provide means to prevent starting of the vehicle when any of the doors are open, thus eliminating accidents caused by starting the vehicle while anyone is getting in or out, or prevent tearing off of the doors by trying to pass another vehicle or entering a garage when a door is open.

Another object of the invention is to provide means for automatically releasing the clutch and thus stopping the driving effort of the motor in case of accident, as for example, should the car bump into another object.

Still another object of the invention is to provide novel mechanism to prevent driving of the vehicle at excessive speeds, which mechanism, however, is under control of the owner of the car and may be set to prevent operation of the vehicle beyond a certain speed, and is associated with suitable signals to indicate to the driver when certain speeds are exceeded and also to transmit the same information to a traffic officer.

With the foregoing and other objects in view, the invention consists in certain novel features of construction, combinations and arrangements of parts as will be more fully disclosed in connection with the accompanying drawings.

In these drawings:

Fig. 3 is a view of the power control for the clutch indicating various positions assumed in the operation thereof.

Fig. 4 is a longitudinal section through one form of power device taken substantially on lines 4—4 of Figs. 3 and 5.

Fig. 5 is a cross section substantially on lines 5—5 of Figs. 4 and 34.

Fig. 6 is a diagram curve illustrating the automatic control of the clutch engagement by the devices of Figs. 3 and 4.

Fig. 7 is a partial side elevation and partial section of a somewhat modified construction of a power device for controlling the operation of the clutch.

Fig. 8 is a diagram curve illustrating the operation of the device of Fig. 7.

Fig. 9 is a partial side elevation and partial section of another modified form of power device.

Fig. 10 is a side elevation of a portion thereof.

Fig. 11 is a longitudinal section of still another modified form of power device.

Fig. 12 is a longitudinal section of another modification of a power device.

Fig. 13 is a diagram curve illustrating the operation of the device of Fig. 12.

Fig. 14 is a detail of the control device for the mechanism of Fig. 12.

Fig. 15 is a wiring diagram for the improved safety system.

Fig. 16 is a longitudinal section of a power device for operating the clutch with the automatic control for the clutch engagement.

Figs. 17 and 18 are a top plan and front view, respectively, of a brake control pedal equipped with means for also releasing the clutch as will be used in association with the improved clutch control power devices.

Fig. 19 is a diagrammatic view of the forward portion of the motor vehicle showing how this improved clutch control can be associated with devices connected to a bumper to automatically release the clutch in the event of collision with any object.

Fig. 20 is a detail section showing one means by which the control of Fig. 19 may be operated.

Fig. 21 is a vertical section through a portion of the mounting for a gear shift lever and showing it diagrammatically with a switch operated by a door or other device to prevent engagement of the clutch under certain specified conditions.

Fig. 22 is a partial side elevation and partial section of an automatic control for the throttle valve.

Fig. 23 is a front elevation of a speedometer equipped with means whereby the clutch control can be used as a safety device to prevent operation of the vehicle at excessive speeds.

Fig. 24 is a detail section of a portion of this device.

Fig. 25 is a diagrammatic view of the control mechanism on this device.

Fig. 26 is a detail section substantially on line 26—26 of Fig. 24.

Fig. 27 is a partial side elevation and partial section of a speedometer device which may be associated with my improved clutch control to prevent operation of the vehicle beyond certain speeds, the section being substantially on line 27—27 of Fig. 28.

Fig. 28 is a top plan view of the device of Fig. 27, substantially on the line 28—28 of Fig. 27.

Figures 1, 2:
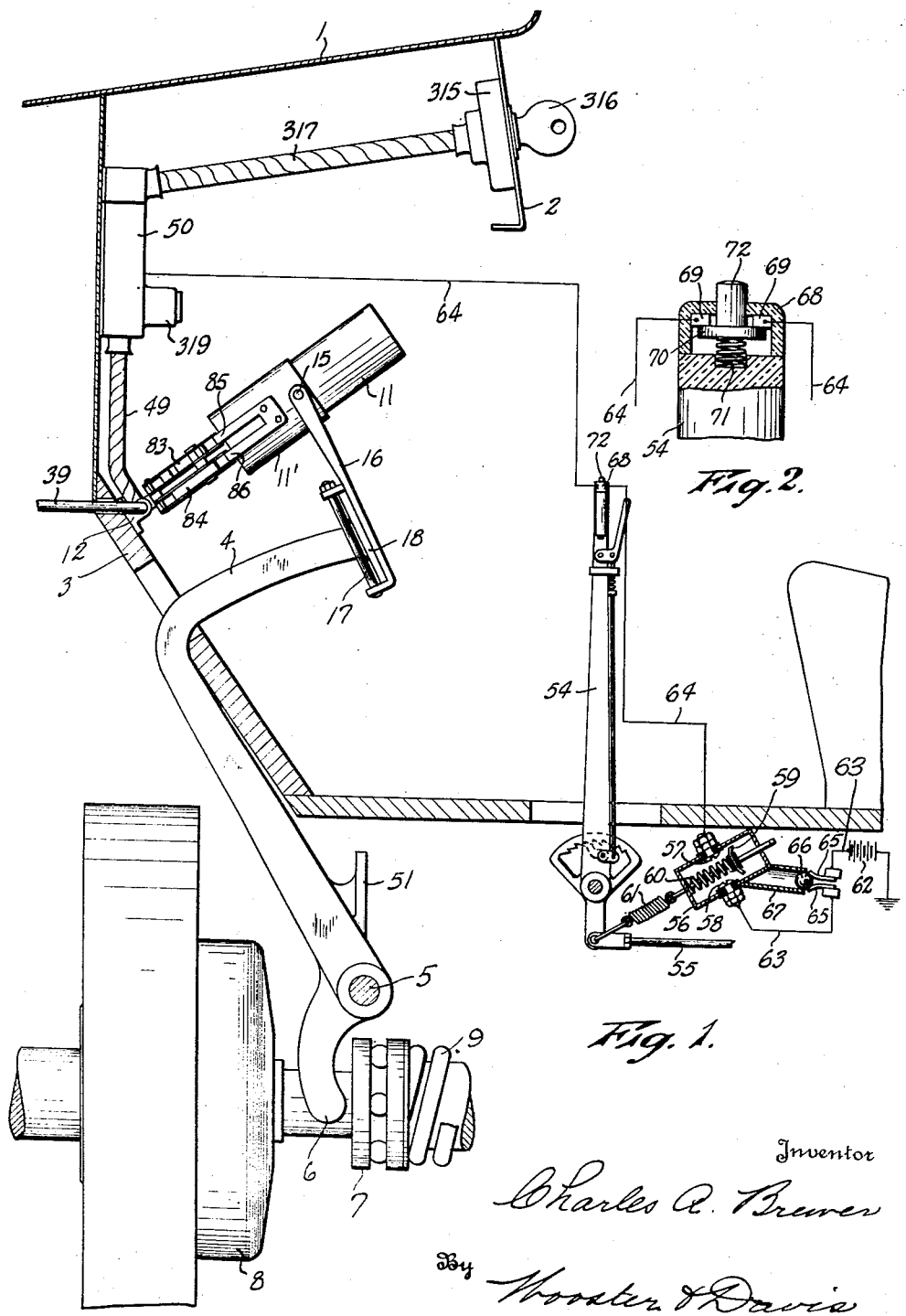
Fig. 1 is a partial side elevation and a partial vertical section of a system shown somewhat diagrammatically for an automatic power control of the clutch of a motor vehicle associated with the manual operation of the emergency brake.
Fig. 2 is a detailed section of a manually controlled switch in the brake control lever.

Fig. 29 indicates signal lights which may be used with the automatic speedometer control.

Fig. 30 is a partial side elevation and partial section of an improved safety throttle control which may be employed with my improved clutch control.

Fig. 31 is a front elevation of the footrest for this device.

Fig. 32 is a partial section and a partial side elevation of a steering wheel and column showing how the clutch control may be operated therefrom.

Fig. 33 is a plan view of this steering wheel, and

Fig. 34 is a view similar to Fig. 4, showing one form of manual or mechanical control for the power device.

Referring first more particularly to Figs. 1 to 6, numeral 1 represents the cowl of the automobile from which depends the usual instrument board 2, and below the cowl is the inclined foot board 3 which has openings therein for the usual brake and clutch pedals, the clutch pedal being indicated at 4 mounted on any suitable pivot 5 and having extension or fork 6 to engage the thrust collar 7 for releasing the clutch 8 in the usual manner by separating the friction discs against the action of any suitable spring 9 which operates in the usual well known manner to cause the clutch to engage when the pressure on the clutch pedal is released and thus to transmit driving effort from the motor to the vehicle drive. In adding my improved control mechanism, I preferably do not remove or change this clutch pedal so that it is always in position for foot operation if desired, altho I may connect my device directly to the clutch, but I preferably attach the power device to the clutch pedal so that it may be added to vehicles already in use. The clutch can be controlled by either arrangement in the same manner as by expert foot operation of the clutch pedal.

One improved form of power device for operating the clutch is shown in section in Figs. 4 and 5 and an exterior outline in Figs. 1 and 3. This power device comprises two relatively movable elements, in the present case, a piston element 10 and a cylinder 11 enclosing the piston, either of which may be movable. In the present arrangement, I prefer to have the piston a stationary element and slide the cylinder relative thereto to impart movement to the device. I, therefore, mount a bracket 12 on the foot board 3 and secure it thereto by any suitable means. A stem 13 is connected to the piston and is pivotally connected to the bracket 12 by any suitable means such as a pivot pin 14. The cylinder 11 carries trunnions 15 adapted for pivotal connection with a bracket arm 16 which may be clamped by any suitable means, as by bolts 17, to the head or foot rest 18 of the clutch pedal 4. Therefore, as the cylinder moves, the clutch pedal will be correspondingly shifted, the pivotal connections 15 and 14 permitting the power device to swing to compensate for the movement of the head 18 about the pedal pivot 5.

The power device in the present instance, is operated by suction from any suitable device, such for example as the intake manifold of the vehicle motor, and it is shown as electrically controlled, altho it can be manually or mechanically controlled as shown in Figs. 12 and 34, for example. The piston may carry the usual cup leather 19 to prevent leakage past the piston, and it is guided in the cylinder by the annular walls 20. This piston also carries the control mechanism therefor. This comprises a solenoid 21 mounted in a casing 22 in the piston and having a central opening 23 through which extends an armature 24 having valves 25 and 26 at its opposite ends to control openings 27 and 28, respectively. The opening 27 is in the top wall of casing 22 and communicates with the space 29 leading through the space 30 to a passage 31 communicating to the atmosphere through branch passages 32 and 33. The space 34 inside the casing 22 communicates with the space 35 in the cylinder above the piston through passages 36 in the connecting bolt 37. The opening 28 and valve 26 control communication from the space 34 and passage 23 to a passage 38 extending longitudinally in the stem 13 of the piston, and this passage is connected through a suitable tubular connection 39 with the source of suction, such as the intake manifold indicated at 40 of the vehicle motor. A joint 41 permits relative turning movement between this connection and the pivot pin 14, and this joint also serves as the means for carrying a check valve of any suitable type such as the ball 42 normally held against its seat by a spring 43. As shown in Fig. 4 this is so arranged as to permit passage of air from passage 38 to the motor, but to prevent flow of air in the opposite direction. A spring 44 embraces the armature 24 and tends to shift it downwardly to close the valve 26 and open the valve 25, and therefore, solenoid 21 is so arranged that excitation thereof will raise the armature 24 to close the valve 25 and open the valve 26. This will place passage 38 in communication with space 35 in the cylinder above the piston causing the air therein to be exhausted by the suction of the motor. Lead wires 45 are led to the solenoid through a tube 46 connected to the piston and stem 13, and the wires are connected to a suitable jack 47 for forming electrical contact with the contacts 48 leading through a flexible protective cable 49 leading to a connection box 50 mounted in any suitable position, as under the cowl where it is easily accessible and in which the desired electrical connections may be made to the various control switches to be later described. The clutch pedal may be provided with a stop lug 51 to co-operate with an adjustable stop screw 52 to limit upward movement of the pedal under the action of a spring 53.

It will be apparent from Fig. 4 that the device is normally in the position shown in Figs. 1, 3 and 4 with the cylinder 11 in its upper position and the space 35 in communication with the atmosphere through the passage 31 as the valve 25 is opened, and therefore, clutch pedal 4 is raised and the clutch is in engagement. In Fig. 1 is shown associated with this power device a control operated in conjunction with the emergency brake. The emergency brake hand lever is indicated at 54 and is connected to the emergency brake operating mechanism, not shown, through rod 55. The lever is shown in the off position with the brake released. Connected to this lever is a switch 56 having contacts 57 and 58 which may be bridged by a movable contact 59, normally held in the open position shown by the spring 60. Contact 59 is connected to the lever 54 through a spring 61. One of the contacts as 58 is connected to the battery 62 through lead 63 while the other contact as 57 is connected through a lead 64 to the power device 10, 11 through the leads 48, connections being made in the box 50. If desired, there may be a ball control switch in the leads 63. Thus, the lead may be connected to two spaced contacts 65 which may be bridged by metal ball 66 running in an insulating tube 67. This tube, when used, is inclined rearwardly a few degrees so that when the vehicle is on the level or an up grade, the ball 66 bridges the contacts 65, but when the vehicle is on the down grade, the ball 66 will roll away from the contacts and open the circuit. In the lead 64, if desired, there may be provided a switch, preferably mounted on the top of the lever 54. Thus, the insulating casing 68 may carry two spaced contacts 69 which are bridged by a conductor 70 normally held in engagement with the contacts 69 by spring 71. A button 72, projecting through top of the casing will shift the contact 70 away from contacts 69 when depressed to open the circuit.

It will be obvious from the foregoing that when the circuit is closed through the solenoid 21 by closing of the switch 56, the armature 24 will be raised, closing the valve 25 and thus cutting off communication of chamber 35 above the piston with the atmosphere and at the same time, opening the valve 26 and thus placing the chamber 35 in communication with the intake manifold 40 of the motor through the passage 38. The suction of the motor, therefore, creates a partial vacuum in the chamber 35 causing the cylinder to be drawn downwardly and with it, clutch pedal 4 to release the clutch 8. Thus no foot operation of the clutch pedal is required by the operator, although he may depress the pedal with his foot to release the clutch if he wishes. If the circuit is then broken through the solenoid 21, the armature 24 drops under action of spring 44 closing the valve 26 to shut off communication of the chamber 35 with the intake manifold and opening valve 25 to place this chamber 35 in communication with the atmosphere through the conduit 31. Thus the vacuum in the chamber 35 is broken permitting the cylinder to move upwardly under the action of the springs 9 and 53 and permitting the clutch to engage. If, however, this cylinder was merely permitted to move rapidly upward without any control, the clutch would be engaged too rapidly causing a sudden jerking start of the car or stalling of the motor, and to overcome this objection, I have provided an automatic control which so controls the upward movement of the cylinder and engagement of the clutch that the clutch is engaged in the same manner as it would be in expert foot operation. For this purpose, the passage 31 is in communication with passages 32 and 33 and the cross passage 73. Passages 32 and 73 are constantly in communication with the atmosphere through the opening 74 which is restricted by an adjustable needle valve 75 to restrict and regulate the entrance of air. The communication of passage 33 with the passage 73 is restricted and controlled by needle valve 76. Passage 33 is also in communication with the atmosphere through an opening 77, while the passage 32 is in communication with the atmosphere through a similar opening 78. The openings 77 and 78 are controlled by movable valves 79 and 80 respectively and are normally held from their seats by the springs 81.

The valves 79 and 80 are mounted on supports pivoted at 82, and they each carry a cam block. The support for valve 79 carries cam block 83 while the support for the valve 80 carries cam block 84 cooperating respectively with springs 85 and 86 mounted on the cylinder 11 or the holder 11' therefor so as to move with the cylinder. The outer surfaces of these cams may be made any shape desired to control the opening and closing of the valves 79 and 80 as the cylinder 11 moves and carries the spring fingers 85 and 86 over the surfaces of these cams. In the arrangement shown in Figs. 4 and 5, the cam 84 has a straight outer wall 87 while the cam block 83 is stepped or recessed as shown at 88 and 89 to provide spaced cam surfaces 90 and 91. When the finger 86 presses on the cam surface 87, it will close the valve 80. When finger 85 presses on the cam surfaces 90 or 91 it closes the valve 79. At other times, the valves 79 or 80 are open.

These cams can, therefore, be so shaped as to control the upward movement of the clutch pedal or, that is, engaging movement of the clutch to give ideal clutch operation in its engaging movement. The cam blocks 83 and 84 are adjustably mounted on their supports so that they may be adjusted longitudinally thereof to vary the time of operation of the valves 79 and 80. Such an adjustable mounting may be a bolt 92 passing through each cam block and through elongated slots in their supports. Thus, when valve 80 is open it permits relatively free entrance of air into the cylinder. With valve 80 closed and valve 79 open the entrance of air to the cylinder is controlled by needle valves 75 and 76 which restrict the entrance of air and cause a partial vacuum to retard upward movement of the pedal or engagement of the clutch. With both valves 79 and 80 closed, the entrance of air is controlled by needle valve 75 only and so may be highly restricted, increasing the vacuum resistance in the cylinder and further checking clutch engagement. Thus, valves 79 and 80 can be operated alternately or in whatever relation is necessary to get easy starting effort on the clutch.

With the cams shown, the engaging movement and effect of the clutch is indicated diagrammatically in Fig. 6 in which the the abscissae represent foot pedal travel in inches and the ordinates represent partial vacuum resistance in the cylinder in total pounds for about a two inch cylinder and considering that 25 pounds resistance will stop movement of the clutch pedal. Therefore, the nearer the resistance is to 25 pounds, the slower the pedal will move while the lower the resistance, the faster the pedal will move. Thus, on the reverse or upward movement of the cylinder 11 from its lowest position, fingers 85 and 86 are below the cam surfaces 91 and 87 from the zero movement to the point A on the diagram of Fig. 6, so that during this movement, both valves 79 and 80 are open and there is very little resistance to the upward movement of the cylinder as the pressure therein is very little below atmospheric pressure. During this movement the clutch is wholly disengaged and this amount of movement is always provided to insure complete disengagement of the clutch on the clutch releasing operation. At point A fingers 85 and 86 begin to ride up on the inclined surfaces 93 on the cams and start to close the valves 79 and 80. This increases the resistance to the movement of the cylinder 11 by reducing the inflow of air to this cylinder, thus, increasing the partial vacuum, and therefore, the movement of the clutch pedal is slowed up. This is indicated by the inclined portion of the curve AB. At point B, fingers 85 and 86 ride onto cam surfaces 91 and 87 and close both valves 79 and 80. This is at the point at which the clutch starts engagement, and as the only air that can enter the cylinder, must enter it through the opening 74 past the needle valve 75, the movement of the clutch pedal at this point is very slow, which is as it should be as it is the point at which the clutch first begins to take hold and the car begins to move. At the point C, finger 85 begins to ride off surface 91 so that at point D valve 79 is open, and as finger 86 remains on cam surface 87, valve 80 remains closed. This allows more air to enter the cylinder past the needle valve 76 thus reducing resistance to movement of the cylinder and permitting somewhat more rapid engagement of the clutch from the point D to the point E. During this movement, the car picks up speed and then finger 85 begins to ride up the incline 94 to the cam surface 90 closing the valve 79. The clutch at this point is nearly engaged and is indicated by the point F on the diagram, the valve 79 being momentarily kept closed to permit the car to gain momentum while the clutch is held nearly stationary. The finger 85 then rides off the cam surface 90 permitting the valve 79 to open which is represented by the portion of the curve from F to G. The car is then in motion, and as the valve 79 is open, the movement of the clutch pedal increases until at the point H, the clutch is fully engaged. At this point finger 86 rides off the cam 84, permitting the valve 80 to open, the opening movement being represented by the line H to I of the diagram. At this point, the valves 79 and 80 are fully opened permitting practically free entrance of air, and as the clutch is fully engaged, the remainder of the movement of the clutch pedal is very rapid and is represented by the curve from I to J. This is movement that is allowed to insure the full engagement of the clutch and to permit disengagement of the operating extension or fork 6 from the clutch collar to prevent undue wear. Thus in the engaging movement of the clutch, the movement from the point O to the point A must be very rapid to quickly take up the lost motion and not delay starting, especially in traffic. Then at the point B when the clutch first begins to engage, the movement of the pedal must be very slow to permit the clutch to take hold and start the car with an easy gradual movement without jumping or jerking. After the car starts to move the clutch may be let in more rapidly for a short period to get a greater engagement and driving force, and then the pedal movement should be held substantially stationary for a short time to permit the car to gather more speed, after which the clutch may be let into full engagement, and then the remainder of the lost motion quickly accomplished as represented by the movement from I to J. It will thus be apparent that this device automatically controls the engaging movement of the clutch to provide clutch operation which is a duplicate of expert foot control, so that no matter how inexperienced or unexpert the driver may be the clutch is always operated in the same ideal manner to start the car without jumping or jerking, thus eliminating excessive strains on the car and tires and discomfort to the occupants. It also prevents stalling of the motor, as the clutch is let in at the proper speed and eliminates racing of the motor such as might occur if the clutch is not engaged soon enough in foot operation.

Thus, in referring to Fig. 1, when the operator of the vehicle applies the emergency brake by shifting the lever 54 to the right, he will close the circuit through the switch 56 energizing the solenoid 21 and releasing the clutch, especially if the car should be stopped on an up grade or on a level road, and the clutch is held automatically released until the emergency brake is released. When starting on an upgrade with an ordinary control, the emergency brake is used to prevent backward movement of the car until the motor has been accelerated and the clutch has started to engage. It is evident that an unskilled operator might permit the clutch to engage too far before the brake is released thus stalling the motor or causing the car to start with a jerk, or if he is too slow in operating the clutch, he will be apt to race the motor. With the present arrangement, however, in starting on an upgrade all the operator has to do after setting the gear shift is to accelerate the motor and then release the emergency brake. This automatically opens the circuit through the switch 56 permitting the power device to let the clutch pedal come back for engagement of the clutch, but as the clutch is automatically controlled, as above described, the clutch comes into engagement with ideal operation, preventing backward rolling of the car and giving easy gradual starting of the car without jerks or stalling of the motor. The clutch driving effort to the inertia of the car takes place in proper timed relation so as to move the car forward immediately upon releasing the emergency brake. This control, therefore, forms a back lock on grades preventing the car from rolling back down hill. With the emergency brake on, the clutch is disengaged permitting the operator to select his proper gear speed which may be accomplished without the usual foot operation of the clutch, and the car may remain standing with the emergency brake on and the gears in mesh so that it is ready to immediately start forward at any time by merely releasing the emergency brake. Thus, for example, after waiting for a traffic light to change, the car can get away easily and smoothly with a minimum loss of time, and there is no danger of stalling the motor in doing so. It also prevents operation of the car with emergency brakes on as is sometimes done with present constructions causing heating of the brake band and drum and sometimes causing fire. This heating often distorts the brake drums making it impossible to afterwards get a proper adjustment of the brakes and the burning of the lining often requires a relining of the brakes. With our construction, the clutch is released as long as the emergency brake is set so that the car under normal operation can not be started until the emergency brake is released. If, however, the automatic switch 65, 66 is employed then when the car is on a down grade greater than the angle of inclination of tube 67 the ball 66 rolls away from the contacts 65 opening the circuit through the clutch power device. This automatically permits the clutch to remain in engagement to use the compression of the motor as a brake on such a grade, and at the same time it permits application of the emergency brakes on a down grade without releasing the clutch. With the use of the hand switch 69, 70, the operator, if he desires, can open the circuit by merely pressing the button 72 to permit the clutch to engage at any time.

If while the chamber 35 in the cylinder is in communication with the intake manifold by a direct connection and the clutch is therefore released, the operator should suddenly open the throttle the suction in the manifold would suddenly drop permitting air to flow back through the connection to the cylinder 11 and permitting the clutch to engage. This objection is obviated by the check valve 42 which will permit flow of air from the cylinder 11 through the connection 39 to the manifold, but will prevent flow in the opposite direction, so that should suction in the intake manifold suddenly drop while the valve 26 is open, this would not affect the required maintaining of the reduced pressure in the cylinder chamber 35.

Referring to Fig. 3, some of the various positions of the clutch pedal are indicated in full and dotted lines. Thus, the dotted line position *a* indicates the completely depressed position with the clutch disengaged, and the distance from *d* to *a* represents the travel to insure complete disengagement of the clutch for proper gear shifting shown in the curve of Fig. 6 as about three and a half inches. Travel from *a* to *b* shows the first part of the reverse movement which is very rapid, *b* being the position just before the clutch begins to engage. The movement from *a* to *b* corresponds to the movement from O to A in the diagram in Fig. 6. The movement from *b* to *c* represents the travel controlling the movements of the car in starting. On this part of the clutch travel depends the proper starting of the car, and is represented on the diagram of Fig. 6 from about the point A to the point I, and represents a movement of about one and a half or more inches. The movement from *c* to *d* is the travel which insures complete engagement of the clutch with full pressure of clutch spring 9. It also provides the necessary clearance at the clutch thrust bearing relieving undue wear on this bearing. It corresponds roughly to the movement from the point I to point J in the diagram of Fig. 6.

In Fig. 7 is shown a somewhat different mechanism for automatically controlling the clutch engagement. The cylinder construction 11 and piston construction are the same as that shown in Fig. 4. That is, the piston carries the solenoid 21 and the control valves 25 and 26 the same as illustrated in Fig. 4, the valve 26 controlling the conduit 38 in the stem 95 connected by a hinge connection similar to that shown in Fig. 4 to conduit 39 leading to the intake manifold of the motor. This conduit also has the spring pressed check valve 42 the same as shown in Fig. 4. The construction for automatically controlling the clutch engagement is somewhat different. Passage 31*a*, the same as the passage 31 in the form shown in Fig. 4, leads to the chamber 35 of the cylinder through the spaces 30 and 29, valve 25 and connecting bolts 36, the same as in the form of Fig. 4. It leads to a chamber 96 which is closed on one side by a flexible diaphragm 97 connected to a rod 98 carrying a valve 99, adapted to close the entrance to passage 100 which connects the chamber 96 with the atmosphere when the valve 99 is open as shown in Fig. 7. A spring 101 tends to hold this valve open. An adjustable compression spring 102 mounted on the cylinder reacts on a lever 103 pivoted at 104, and the pressure of the spring 102 may be adjusted by means of the adjusting screw 105. At its opposite end, the lever 103 carries a roller 106 adapted to run over the outer surface of a cam block 107 mounted on a lever 108 pivoted to the stem 95 at 109 and adapted to engage at its free end against the stem 98 of the valve 99. The cam block 107 is adjustably mounted on the lever 108 by means of a nut and screw 110 in a slot 111. The spring 102, cooperating with the cam 107, controls the vacuum resistance in the cylinder during the clutch engaging movement.

Thus, in operation, the clutch is released by energizing the solenoid 21 carried within piston 10 as illustrated in Fig. 4, closing valve 25 and opening valve 26 thus cutting off communication of chamber 35 with the atmosphere through the passage 31*a* and connecting this chamber with the intake manifold of the motor through the pipe 39. The cylinder is then drawn down to its lowest position as indicated in dotted lines, Fig. 3, it being in its uppermost position in Fig. 7. Now, when the remote control of the solenoid 21 operates to open the circuit through the solenoid, the rod 24 drops closing valve 26 leading to the suction or intake manifold and opening valve 25 which places chamber 35 in communication with the atmosphere through the passage 31a and valve 99, 100. In this position, the roller 106 is below the cam 107 and the valve 99 is open. As the chamber 35 in the cylinder is now in free communication with the atmosphere, springs 9 and 53 of the clutch force the pedal and cylinder upwardly and move the clutch toward engagement. The diagram in Fig. 8 shows approximately the action during the clutch engaging movement and the upward movement of the clutch pedal. In this diagram the ordinates represent resistance to upward movement of the pedal in pounds while the abscissae represent inches of movement of the pedal. Thus, when the remote control breaks the circuit through the solenoid 21 as just described, the pedal is in its lowest position indicated by the point O. As the roller 106 is below the cam 107, valve 99 is open giving free communication with the atmosphere for chamber 35 in the cylinder, which provides very little resistance to upward movement of the pedal. This is a rapid movement indicated on the curve in Fig. 8 from point O to point A. Point A is just prior to beginning of clutch engagement and at this point, the roller 106 runs onto the cam 107 at point 112. If spring 102, for example, has been adjusted to maintain 15 pounds vacuum resistance in the cylinder chamber 35, and as the vacuum in the chamber at this point is very small, the roller 106 on cam 107 will close valve 99 preventing further entrance of air. This will increase resistance to upward movement of the cylinder and clutch pedal, slowing up the clutch engagement which is indicated on the diagram of Fig. 8 from point A to point B. The clutch starts engagement soon after the point A so that it will be seen, the clutch moves very slowly as it starts engagement, thus permitting the car to start in motion with a very easy movement and without jerking. The car probably starts to move about the time or just before the point B. Beyond this point as the car has started in motion, it is desirable that the clutch move somewhat more rapidly and therefore, at this point, the roller 106 begins to run off the hump 112 on the cam 107 into the hollow 113. This reduces pressure on the valve 99 permitting it to partially open and admit more air to the cylinder and is represented by more rapid movement of the cylinder as the vacuum resistance is decreased, and is indicated by the curve B to C in the diagram. The car has now started and while it gains momentum, it is desirable that the clutch move somewhat more slowly and, therefore, the roller 106 runs up on the raised portion 114 of the cam again closing the valve 99. If the vacuum in the cylinder is not greater than the pressure for which the spring 102 is set, this causes increasing of the vacuum and an increased resistance to the movement of the clutch pedal as indicated by the curve from C to D. At the point D the clutch is nearly engaged and the car has gained momentum, and as the roller 106 drops off the point 114, the valve 99 is again permitted to partly open admitting atmospheric air to enter causing the vacuum resistance to drop as indicated by the curve D to E. The roller 106 runs on the straight surface 115 for a short time as indicated by the curve E to F permitting the clutch to become completely engaged at F, when the roller 106 runs off the cam entirely permitting the valve 99 to fully open and reducing the vacuum in the chamber and the consequent clutch resistance as indicated by the curve F to G. The clutch is now fully engaged and the rest of the movement of the pedal is merely the lost motion movement to insure that the clutch remains fully engaged and is made very rapidly as indicated by the curve G to H.

It will be understood, that this operation as just described, is merely an example and that the clutch engagement movement may be given different control and different timing by merely changing the shape of the cam 107 or adjusting its position on the lever 108, or by adjusting the pressure of the spring 102. The outward movement of lever 108 may be limited by a stop 108' on the lever and adapted to engage the stem 95. The pressure of the spring 102 and the diaphragm 97 in this device automatically compensate for leaks in the system or other abnormal conditions, to maintain the automatic control and operation desired for the clutch engagement. Thus, for example, as the vacuum in the cylinder is equal to the spring pressure ratio against the diaphragm area, the diaphragm and valve 99 regulate the vacuum in the cylinder, but they are controlled by the spring 102 and the cam 107, the amount of the vacuum being controlled by the spring 102, while the cam 107 controls the effective pressure of spring 102. Thus, for example, if spring 102 is set for fifteen pounds, when roller 106 runs onto the high parts of the cam, the valve 99 will remain closed until the vacuum reaches fifteen pounds. If the vacuum increases beyond this point, pressure on diaphragm 97 will then open the valve 99 against the action of spring 102 even though the roller may still be on the high part of the cam. Thus, the vacuum or vacuum resistance in the cylinder can never get beyond that for which the spring 102 is set even though there might be abnormal conditions. Therefore, the main operation and function of the diaphragm 97 in cooperation with the spring 102 is to maintain the same relative vacuum in the cylinder at given points in the movement of the cylinder in the control of the clutch engagement travel regardless of leaks or other abnormal conditions tending to change conditions in the cylinder. In other words it automatically compensates for leaks or other outside things tending to change conditions in the cylinder chamber.

Referring to Figs. 9 and 10, these figures show still another form of automatic clutch engagement control device. The automatic control in this form is more nearly that shown in Fig. 4, except that the valves are electrically controlled by cams instead of mechanically as shown in Fig. 4. The cylinder 11 and the piston within the cylinder are the same as shown in Fig. 4 including the same solenoid 21 and the valves 25 and 26 controlling the atmospheric and suction connections to the chamber 35. The valve 26 controls a conduit 38 leading through the stem 116 to the conduit 39 leading to the intake manifold of the engine shown in Fig. 4 and this conduit has the same check valve 42. Valve 25 controls communication of chamber 35 with the atmosphere through the conduit 31b. This conduit 31b has a branch 117 leading directly to the atmosphere which is controlled by valve 118.

There is another communication of this passage with the atmosphere through opening 119 which is restricted by a needle valve 120. Another passage 121 leads to the atmosphere at 122 through a restricting needle valve 123. The opening to 122 is controlled by valve 124. Valves 118 and 124 are controlled respectively by solenoids 125 and 126, but are normally held in the open position by springs 127. Adjustably mounted on the stem 116 are cam blocks 128 and 129, the adjustment being secured by clamping bolt 130 in slots 131 in the cams. These cams cooperate with spring contact fingers 132 and 133 mounted on insulating support 134 on the cylinder. Finger 132 coacts with the cam 128 while finger 133 coacts with the cam 129. The valve 118 corresponds to the valve 80 in Figs. 4 and 5 while valve 124 corresponds to valve 79 in Figs. 4 and 5. Also needle valve 120 corresponds to valve 75 in Figs. 4 and 5, and valve 123 corresponds to needle valve 76. The solenoids 125 and 126 will be grounded through the contact fingers 132 and 133 when they engage the surfaces of the cams 128 and 129 while the other terminals of the solenoids are connected to the car battery 62, the negative pole of which is also grounded as indicated. Thus, for instance, with this device the clutch is released by remote control the same as in the other forms by controlling the solenoid 21 and valves 25 and 26 in the piston to move the cylinder to its lowermost position. On its upward movement to permit engagement of the clutch, fingers 132 and 133 cooperate with the cams 128 and 129 to automatically control the clutch engagement similar to that indicated in Figs. 4, 5 and 6. Thus, the finger 132 engages cam 128, closing the circuit through the solenoid 127 and closing valve 118. This gives the same effect as closing valve 80 in form shown in Figs. 4 and 5. Also finger 133 engaging cam 129 closes the circuit through the solenoid 126 to close valve 124 which has the same effect as closing valve 79 in the form in Figs. 4 and 5. Thus, by properly designing the surfaces of the cams 129 and 128, the valves 118 and 124 may be alternately opened and closed during the upward movement of the clutch pedal, or that is, during the clutch engaging movement, to automatically give the desired clutch engagement control.

In Fig. 11 is shown still another arrangement for automatically controlling clutch engagement. The cylinder 11 carries piston 135 which also carries a solenoid 21 for manipulating the valves 25 and 26. The valve 26 controls the passage 38 in the stem 136 leading to the source of suction such as the intake manifold of the engine the same as in the other forms described. The passage 38 communicating with the manifold is controlled by the check valve 42 the same as in the other forms described. The valve 25 controls the opening 27 leading to the space 29 which communicates through the opening 27 with the chamber 35 through the hollow rivet 137. Chamber 29 is in communication with the atmosphere through the conduit 138. At one side of the stem 136 is a supporting rod 139 which is insulated from the other elements by the mountings 140 and 141 of insulating material. A spring contact 142 connects to the disc 24' carried by the bar 24 and is, therefore, grounded through this bar. One end of the solenoid 21 is connected to the insulated spring contact 143 through the lead 144 and the other end of the solenoid is connected by lead 145 to the battery 62 which is grounded in the usual manner. Any remote control switch, such for example as the switch 56, is connected in circuit with solenoid 21 and battery 62 through lead 144, or any of the other remote control switches shown in the various drawings may be used. Mounted on the rod 139 is a block 147, and it may be adjusted thereon by means of an adjustment and securing screw 148. This block carries a series of projecting pins 149 which project from one side thereof in the path of movement of the spring finger 143.

In operation, assuming switch M to be in closed position, closing the remote control switch indicated at 56 to energize solenoid 21 and raise the rod 24 closes the valve 25 and opens valve 26. This will cut off communication of chamber 35 with the atmosphere and will place it in communication with the source of suction such as the intake manifold of the motor, the same as in the other forms described. The suction in the chamber will cause the cylinder to move down to its lowermost position and carry with it the pedal as indicated by dotted lines in Fig. 3 and release the clutch the same as in the other forms. When the circuit is broken by opening the switch 56, the valve 26 becomes closed cutting off chamber 35 from the suction, and opening valve 25 to place the chamber in communication with the atmosphere. The cylinder and the pedal begin to immediately move rapidly upwardly under action of springs 9 and 53 until just before the clutch begins engagement. At this point finger 143 engages the lower pin 149 thus closing the circuit through the solenoid 21 again closing the valve 25 and opening the valve 26. This immediately causes a resistance to upward movement of the cylinder and retards this movement until finger 143 passes off the first pin 149 thus breaking the circuit through the solenoid 21 and causing valve 26 to close and valve 25 to open. When finger 143 hits the next pin 149, the circuit is again closed. Thus, as the cylinder moves upwardly, valves 26 and 25 are alternately opened and closed by engagement of the finger 143 with the pins 149 and by suitably spacing the pins 149, the rate of vibration or movement of valves 25 and 26 between the closed and open positions or that is, their timing between these movements, can be varied as desired to vary the effective vacuum resistance in the chamber 35 to control the movement of the clutch in engaging. In other words the speed of vibration of the valves controls the rate of inflow of air and, therefore, controls the vacuum resistance. This device, therefore, automatically controls the clutch engagement similarly to the other forms described.

Referring to Figs. 12, 13 and 14, I have shown in these figures how the automatic control for the clutch engagement to simulate expert pedal operation can be secured by a greatly simplified construction and without the electrical control. In this form, the cylinder 11 is the same as in other forms described and is connected to the clutch pedal in the same manner through the trunnions 15. In this cylinder is piston 150 which is connected to a stationary part of the machine through the bracket 12 as in the other forms. The connection from the bracket to the piston is a hollow stem 151 which has a passage 152 leading from the chamber 35 in the cylinder through a flexible conduit 153 to a source of suction such as the intake manifold of the engine. The piston carries guiding ribs 154 which maintain it properly centered so that the tube 151 is properly centered in an opening 155 in the lower head 156 of the cylinder. Adjustably mounted on the tube 151 are one or more control blocks 157 and 158. The adjustment may be secured by any suitable means such as screw threads 159. The conduit 153 leading to the intake manifold may be controlled by an electric solenoid and valves the same as those indicated at 21, 25 and 26 in the forms above described, or it may be controlled by a hand operated valve such as that illustrated. In this case, the communication of conduit 153 with the intake manifold is controlled by a valve 160 on a chain 161 connected to a block 162 in a lever 163 which may be the emergency brake lever 54 of Fig. 1, or could be the gear shift lever. The block 162 and the valve 160 are normally held in their upper positions to close communication of conduit 152 with the intake manifold by means of a spring 164. In this position, the block 162 is above an opening 165 leading to the atmosphere. Thus, in this arrangement, if the operator wishes to release the clutch, he can press downwardly on the projection 166 to permit valve 160 to open and will move the block or piston 162 across the opening 165 leading to the atmosphere. This will cut off communication of chamber 35 in the cylinder with the atmosphere and will place it in communication with the intake manifold. The suction, therefore, created in the chamber 35 will force the cylinder downwardly to release the clutch at which time the cylinder and pedal will be in the dotted line position. As the cylinder moves downwardly, the control blocks 157 and 158 will pass through the opening 155 and as they are a fairly close fit in this opening, the suction created below the piston, due to restricted entrance of air through the opening 155 while they are in this opening, would tend to stop or greatly retard the downward movement of the cylinder. A normally closed check valve 167 will open under the suction of the air to permit entrance of air and relieve this retarding action by preventing formation of a vacuum under the piston.

If the pressure on 166 is removed, spring 164 will move the valve 160 and plug 162 upwardly. This will cut off communication of chamber 35 with the suction and will place it in communication with the atmosphere through the opening 165. At this time, as the cylinder 11 is in its lowermost position as indicated by the dotted lines the head 156 is below the plugs 157 and 158. The opening 155 in this head is therefore, unrestricted and the cylinder moves rapidly upward under the action of the springs 9 and 53 toward clutch engagement. This is indicated by the movement from zero to A in Fig. 13. At point A however, the head 156 reaches the lower end of plug 157 as indicated in dotted lines 168. This plug, therefore, restricts the opening 155, restricting flow of air through this opening, causing the air to be compressed below the piston and thereby provide a resistance to upward movement of the cylinder, and the rate of movement is controlled by the restricted leakage of air around the plug 157. In the sides of the plugs 157 and 158 are elongated recesses 169 and 170 which, as the plugs pass through the opening 155, permit more or less free passage of air and therefore, permit faster escape of air and reducing resistance to upward movement of the cylinder. Thus, in movement of the cylinder from A to B, Fig. 13 the lower portion of the plug 157 is in the opening 155 practically closing this opening and permitting very restricted escape of air. During this time, the clutch begins to engage and, therefore, very slow movement of the clutch is desired. At point B the car has begun to move and the clutch may be let in somewhat faster for a short time. This is permitted by the recess 169 coming into the opening 155 indicated by the head 156 being at the position 171. This recess permits freer exit of air thus reducing resistance to movement of the cylinder as indicated by the curve from point C to point D. At the point D, the position of head 156 being indicated at 172, the recess 169 has passed out of the opening 155 which becomes again highly restricted, slowing up movement of the cylinder to point E at which point recess 170 runs into the opening. This is indicated by the position 173, permitting free escape of air and movement of the piston to point F. At this point recess 170 passes through the opening which becomes again restricted by plug 158, slowing up the movement of the cylinder as indicated by the curve F to G. At this point the cylinder head 156 begins to move off the plug 158 permitting the resistance to movement of the cylinder to rapidly drop to the point H, at which time the opening 155 becomes wholly unrestricted and the remainder of the movement H to I is very rapid and is the lost motion at the end of the upward movement of the clutch pedal, the clutch probably becoming fully engaged at about the point G or just before it. The stem 151 is pivoted to the bracket 12 by means of a hollow hinge pin 174 similar to the other constructions to permit the cylinder to swing to compensate for movements of the clutch pedal as indicated in Fig. 3.

In Fig. 16 is shown still another simplified construction using entirely a mechanical friction device for controlling the clutch engagement. In this construction, the cylinder 175 is similar to the cylinders 11 of the other forms and is connected to the clutch pedal by the trunnions 176 and the bracket 16. Slidable within this cylinder is a piston 177 connected to a hollow stem 178. The passage 179 in this stem communicates with the chamber 35 of the cylinder above the piston. It is adapted for connection to a source of suction by a flexible connection 153 the same as the device of Fig. 12, and this conduit may be controlled by the same kind of valve 160 in lever 163 or any of the other valve controls controlling the suction and atmosphere. The stem 178 has a ball 180 forming a ball and socket joint which with the bracket 181 which may be secured to the floor boards or any other stationary part of the car the same as the bracket 12 of the other forms. This ball and socket joint permits swinging movement of the cylinder to correspond with movements of the clutch pedal.

The automatic control of clutch engagement is accomplished by means of friction levers 182 pivoted to the cylinder head 183 at 184 and are adapted to cooperate with the cam block 185 adjustably mounted on the stem 178. In the form shown, this block is in the form of a sleeve threaded on the stem for longitudinal adjustment. The surface may be of any shape found proper to give the desired control. The levers 182 carry lugs 186 in which are mounted adjusting screws 187 for compression springs 188. These springs tend to force the contact surfaces 189 against the surface of the cam block 185 and provide a frictional resistance to movement of the cylinder 175. Thus, when the chamber 35 is placed in communication with the suction by any of the remote control devices, the cylinder is drawn downwardly to release the clutch. This brings the arms 182 below the cam block 185.

When the remote control operates to cut off communication of chamber 35 with the suction, and place chamber 35 in communication with the atmosphere, the cylinder immediately starts to move upwardly under the action of springs 9 and 53. The first part of this movement is a rapid one until about the time the clutch begins to engage at which time the levers 182 begin to ride up on the inclined surfaces 190 of the cam block 185. This offers an increased resistance to upward movement of the cylinder by the friction of the levers on the cam block which may be varied by adjusting the springs 188. The action of the levers and the cam block, therefore, automatically slows up movement of the cylinder during the clutch engagement and while the car is starting and picking up speed. A variable rate of movement may be secured by means of lugs or ribs, that is, an irregular surface on the cam blocks to vary the resistance on levers 182 by varying the compression of springs 188. After the clutch becomes fully engaged and the car started, the arms 182 slide off the cam block permitting free and unrestricted movement of the cylinder during the remaining movement of the clutch pedal. Cam block 185 is adjusted so that the arms 182 engage it just before the pedal reaches the point b of Fig. 3 and the arms leave the block when the pedal is in about the position of c.

Several remote control arrangements for these clutch operating and controlling devices are shown in the various drawings, and because of the automatic control of the clutch engagement which may be so designed and regulated as to give the same sort of operation as in expert foot pedal control of the clutch engagement, these devices for operating the clutch are particularly adapted for use with various automatic safety controls. I have shown in Fig. 1 how they may be effectively used in conjunction with the emergency brake. In Figs. 17 and 18 I have shown how it may be applied to a brake pedal so that the driver may easily and quickly release the clutch without effort while his foot is on the brake pedal and may retain the clutch released by this foot if desired all the time his foot is on this pedal. For example, his shoe is indicated in dotted lines at 191 on the brake pedal 192. Secured to this pedal is a bracket 193 carrying a contact 194 insulated therefrom by suitable insulation 195. The lever 196 is pivoted to the bracket at 197 and it is thus grounded thereon and therefore the lever is grounded through the chassis. The lever 196 carries a contact 198 normally held out of engagement with contact 194 by a spring 199. The contact 194 is connected by lead 200 with the controls for any of the devices of Figs. 4, 7, 9, 11, 12, and 16 for releasing and controlling the clutch and which is indicated diagrammatically in Fig. 17 by the solenoid 21 and valve bar 24. The other wire from the solenoid is connected to the battery 62 which is grounded in the usual manner. Thus, if the driver wishes to release the clutch at any time while his foot is on the brake pedal he may do so by merely swinging his foot to the right to shift the lever 196 and cause the contacts 198 and 194 to engage. This closes the circuit through the solenoid 21 operating as above described to release clutch. By removing pressure on the lever 196, the circuit is broken permitting the clutch to engage under automatic control as above described.

In Figs. 19 and 20 is shown a device which is usable with these clutch control devices for automatically releasing the clutch in the case of accident such as running the car against a pole or other object. The showing is somewhat diagrammatic and includes the side members 201 of the frame of the car and the flexible bumper 202. Mounted in the car is a snap switch 203 operated by any suitable means such as a lever 204. This lever extends through slots 205 in one or more slidable members 206 and 207 which are connected by any suitable means such as flexible wire connections 208 and 209 to points on the bumper 202. Springs 210 tend to draw the slides 206 and 207 downwardly to swing the lever 204 to the dotted line position and close the switch 203. These slides, however, are normally held in the position shown by the bumper 202 and with the switch open. The switch 203 is in the circuit including the battery 62 and the solenoid 21 of any of the above described clutch release and control devices. Thus, should the car run into a pole indicated at 211, or other object, flexing of the bumper 202 will release one or both of the slides 206 and 207 permitting the springs 210 to draw it or them downwardly and operate the switch 203 to close the circuit. This will cause the power device indicated in any of the Figures 4, 7, 9, 11, 12, and 16 to function to release the clutch, and the slots 205 are sufficiently long so that should the bumper move back to its normal position, the switch would not again be operated to break the circuit and permit the clutch to engage. It very often happens that serious accidents can be averted or at least their consequences reduced if the driving effort of the motor could be stopped at the point of impact. This is what this device in Figs. 19 and 20 will accomplish. Means are provided for again opening the switch 203 which is accessible to the operator. Thus, a lever 212 is provided to engage the lever 204 of the switch. It may be operated by a wire or rod 213 running to a button 214 easily accessible to the operator, as for instance on the dash 2. Thus, by pulling on the button 214, the switch 203 may be swung to the open position, permitting the clutch to engage and permitting normal operation of the car with the other controls.

This device may also be used in conjunction with a device for automatically throttling down the engine in case of such an accident and at the same time the clutch is released. Such a device is shown in Fig. 22 in which a solenoid 216 is connected to the throttle valve 217 by means of a lever 218 and an armature 219. Thus, when the circuit is closed through the solenoid 216, it forces the armature 219 to the left and closes the throttle valve 217 in the upright pipe 220 leading from the carburetor 221 to the intake manifold. The throttle valve may be controlled in the usual manner through the accelerator pedal by the rod 222, but this rod is connected to the throttle lever 218 by a slip link so that during the excitement, the operator can not open the throttle by pressing on the accelerator while the circuit through the solenoid 216 is closed. Thus, the link 223 may have an elongated slot 224 in which a pin 225 on the lever 218 may slide against action of the spring 226. This spring is of sufficient strength to operate the throttle under normal foot operation but is not sufficient to overcome the action of the solenoid 216 tending to close the throttle valve. A stop 227 may be provided cooperating with the end of the bar 219 to limit closing movement of the throttle, and the bar 219 is adjustably mounted in the lever as indicated at 228 to adjust the limit of the closing movement. This device for automatically closing the throttle may be used with other various remote and safety controls which are illustrated and will presently be described.

Fig. 21 shows another safety feature in which these power devices for releasing the clutch and automatically controlling its engagement may be effectively employed. In this figure, a gear shift lever is shown at 229 carrying member 230 of insulating material which in shape is substantially that of a portion of a sphere so as to permit universal movement over a similarly shaped member 231 of insulating material which is held stationary on the hollow support 232 for the lever. Embedded in the member 231 is a pair of metal conductor rings 234 and 235 which are spaced from each other and, therefore, insulated from each other. One of them is connected by lead 236 to the negative pole of the battery 62 of the car or the lead may be grounded on the frame of the car in the usual manner. The other ring 235 is connected by lead 237 to the solenoid 21 in any of the above described types of power release and control devices for the clutch. The other end of the solenoid is connected by the lead 238 with a contact 239 of a switch 240, contact 239 being adapted to engage with another contact 241 connected to the battery through a lead 242. A spring 243 tends to hold this switch closed, and the switch includes an extension 244 in the path of movement of any one of the doors 245 of the car, extension 244 being so arranged that when the door is closed it will engage the extension 244 to separate the contacts 239 and 241 and open the circuit through the solenoid 21. Embedded in the insulating member 230 is a ring 249 of sufficient width to bridge the two contact rings 234 and 235. Thus, if the gear shift lever is in the neutral position, which is the position illustrated in Fig. 21, the ring 249 does not engage the rings 234 and 235. Therefore, the circuit is broken at this point and the switch 240 has no effect on the solenoid 21 regardless of whether the door 245 is open or closed. However, should the gear shift lever 229 be thrown laterally to any one of the gear meshing positions, the ring 249 will bridge the two rings 235 and 234. If, while the gearshift lever is in this position, the door 245 is closed the switch 240 is open and, therefore, the clutch may be operated by the ordinary controls. If, however, the driver or any one else should attempt to get out of the car while the car is moving with the gears in mesh, opening of the door 245 will permit the switch 240 to close, closing the circuit through the solenoid 21, which will immediately release the clutch in the same manner. If after the car has been at rest the operator tries to start it with any one of the doors open, he can not do so because as soon as he shifts the gear shift lever, the clutch is immediately released. This device, therefore, prevents operation of the car with any of the doors open. If desired, the switch 240 can be given other locations. Other uses will suggest themselves.

In Figs. 23 to 28 is shown how these power clutch release and automatic clutch engagement control devices can be effectively employed to prevent operation of the car beyond a certain maximum speed which may be determined by the owner. Thus, in these figures the ordinary movable ring of the speedometer dial is indicated at 250 and may have mounted thereon suitable lugs 251 arranged at different heights and positions about its periphery, corresponding to different speeds of the car and so arranged that under certain conditions they may engage a spring mounted contact 252 to force it into engagement with another contact 253, normally insulated from each other and mounted on an adjustable yoke 254 of suitable insulating material. This yoke may be adjusted up and down by means of an eccentric 255 which may be turned to different positions by a key controlled barrel 256. The barrel may carry a lock bolt 257 controlled by a key in an ordinary tumbler cylinder 258, and the position of the cylinder 256 may be determined by projecting the bolt 257 in any one of the plurality of recesses 259 located in the sleeve 260 surrounding the cylinder 256. Thus, by turning the cylinder 256 and turning the eccentric 255, the yoke 254 may be raised or lowered carrying with it the contacts 252 and 253. Thus, with the yoke 254 in a given position, the contact 252 would be engaged by one of the lugs 251 on the movable dial to close the circuit at the contacts 252 and 253 through the solenoid 21 of the clutch operating power device and release the clutch when the dial 250 had turned sufficiently to move this lug into engagement with the contact. Also, if desired, the solenoid 216 to close the throttle could be in the same circuit. Thus, if this position of the yoke corresponded to 45 miles an hour, the clutch would be automatically released and the throttle closed when the car was operated above this speed. If the yoke were somewhat lowered then the switch 252 would be engaged somewhat sooner by another lug 251 located lower on the dial and perhaps corresponding to a speed of say 35 miles an hour, so that in this position the clutch would be automatically released as soon as the car was driven above this speed, and so on for different speeds as desired. Thus, the owner of the car can set this device by means of his key and prevent operation of the car beyond the limit determined. The cylinder 256 may carry an indicating pointer 261 operating in conjunction with a scale 262 to indicate the setting desired.

There may also be used in conjunction with this device a signal to automatically indicate to the driver or any other occupant of the car as well as to a traffic officer, whether the car is being operated above certain determined speeds. Thus, a contact 263 carried by the yoke 254 may be connected by lead 265 with contact 253 and so mounted that the contact 263 may move over a series of spaced insulated contacts 266 and 267, etc. These contacts may be connected to a series of lights 268, 269, and so on. Thus, when the contact 263 is set for the speed corresponding to the contact 267, as soon as this speed is exceeded, the switch 252 is closed and will light the lamps 269, one of which may be on the dash, the other may be in a fixture on the front of the car. This will indicate immediately to any one within the car that the speed for which the device is set has been exceeded. These lights 268 to 271, corresponding to the various speed settings of the device may be of different colors as indicated in Fig. 29. Thus, for the lower speed setting, the blue light may be flashed, going through the green and yellow and red corresponding to the highest speed, and these different colored lights will indicate immediately that the car is being operated above a predetermined speed. These lights may be used either with or without the means for automatically releasing the clutch and/or closing the throttle. Thus, if the lights are to be used alone the automatic clutch release and throttle control will merely be disconnected or removed from the circuit as will be obvious.

In Figs. 27 and 28 is shown a somewhat simpler construction for limiting the speed. The movable dial of the speedometer is indicated at 272 and has spaced lugs 273, spaced at different heights and also at different distances around the periphery and adapted to engage a finger 274 adjustably mounted on a movable contact 275 carried by a spring 276. The contact 275 is normally held by said spring spaced from a contact 278 connected to a lead 279 leading to the solenoid 21 of the clutch releasing power device and solenoid 216 of the throttle. Thus, the finger 274 may be set at the desired height to be engaged by one of the lugs 273 depending on the maximum speed desired. When the car reaches this speed the dial 272 in its turning movement will cause one of the lugs 273 to engage the finger 274 to close the switch 275 and 278 which will thus release the clutch and close the throttle.

In Figs. 30 and 31 is illustrated another safety arrangement. It very often happens when an accident is imminent that the driver becomes confused, especially if the conditions change very suddenly, and as he has his foot on the accelerator in normal driving, his first impulse when danger threatens is to press downwardly with his foot as this is the movement in applying the brakes. Various serious accidents have been caused by the driver pressing downwardly on the accelerator thinking he had his foot on the brake pedal, so that instead of checking the speed of the car, it was increased. The device of Figs. 30 and 31 will obviate this danger. In the arrangement shown, there is a foot rest 280 which is mounted for limited downward sliding movement in a bracket 281 secured to the floor boards 3 and also for turning movements in this bracket. Thus, the pedal is mounted on a cylindrical support or shaft 282 which may turn in the bracket and also slide longitudinally in the bearing 283. An extension 284 of the bracket has a non-circular opening in which is mounted a similarly shaped guide 285 on a rod 286. The guide 285 and the opening for it may for example be square or of other desired non-circular shape so that the rod 286 may slide longitudinally, but will be held against turning movement. The upward end of the rod extends into a passage 287 leading from the lower end of the stem or shaft 282 and carries a lateral pin 288 projecting into a curved cam slot 289 in shaft 282. This slot is so curved that when the foot rest 280 is turned to the right or clockwise, as viewed in Fig. 31, the wall of the slot will force the pin downwardly and with it the rod 286 to open the throttle valve indicated at 217. This throttle valve is connected to the rod 286 by the slip link connection shown in Fig. 22 and is also connected to be closed by the solenoid 216 as described in connection with Fig. 22. Also mounted on the bracket 281 and insulated therefrom by an insulating block 290 is a spring contact 291 connected through lead 292 to the solenoid 21 of the clutch releasing power device as above described and also to the solenoid 216. The shaft 282 carries a metal collar 293 fixed thereto by any suitable means as the pin 294. This collar carries an extension 295 normally out of contact with the spring contact 291, but may engage it under certain conditions presently to be described. A compression spring 296 reacts against this collar and the extension 284 to normally hold the shaft and the foot rest in its uppermost position. This is a relatively heavy spring having sufficient tension to support the normal weight of the foot on the foot rest 280 and, therefore, maintain it in the uppermost position. A torsion spring 297 is connected at one end to the bracket 281 as indicated at 298 and at its other end to the shaft 282 as indicated at 299. This spring tends to turn the shaft counterclockwise or to the left as viewed in Fig. 31 to close the throttle, the movement in this direction being limited by any suitable stop 300 engaging one side of the foot rest. The spring 297 is merely of sufficient strength to turn the foot rest and shaft to this position and not place an undue strain on the foot of the operator. In operation, the throttle is controlled by turning the foot rest 280 more or less to the right as indicated in dotted lines, Fig. 31 and of course, the more this is turned in this direction, the further will the throttle be opened by action of the cam slot 289 on the pin 288. Thus, in this construction, the throttle is not controlled by a downward movement of the foot as in the ordinary construction. However, should the operator in the case of a threatened accident press downwardly on the accelerator, instead of increasing the speed of the car, he will close the throttle and throttle down the engine and also release the clutch. This is accomplished by the downward movement of the shaft 282 causing the extension 295 to engage the contact 291 and close the circuit through the solenoids 21 and 216.

In Figs. 32 and 33 is shown an arrangement whereby the automatic clutch release and automatic clutch engagement control device may be operated by hand while the hands are on the steering wheel. Thus the steering wheel is indicated at 301 carrying a flexible connection as a stout cord 302 secured at one end to a spoke of the wheel as indicated at 303 and running through guides 304 in the other spokes and through a guide 305 so that it runs across the sectors formed by the various spokes and the rim of the wheel, so that it may be easily engaged by the fingers while the hand is in steering position on the wheel. The flexible connection 302 then passes over a guide 306 and is connected to a pivoted switch member 307 mounted on a block 308 of insulating material secured to the steering column 309 which is of course grounded through the frame of the machine. A spring 310 normally holds the contact 307 out of engagement with the metal hub 311 of the wheel. The contact is connected by the lead 312 to the solenoid 21 of the clutch release and control devices which is connected to the battery 62 as previously described. Thus, if the driver wishes to release the clutch, all he has to do is to place one or more fingers on the flexible connection 302 and draw it toward the rim of the wheel. This will cause the contact 307 to engage the hub 311 and close the circuit through the solenoid 21 and release the clutch. As soon as connection 302 is released, the clutch will again become engaged under the automatic control as above described. This may be used to hold the clutch released with the gears in mesh while waiting for a stop light to change and so forth, or may be used entirely in driving instead of foot operation of the clutch.

For convenience in wiring and also for the purpose of locking, the leads from all of the various safety devices and remote controls for the clutch release and throttle controls are led to a common connection or terminal box indicated at 50 which may be mounted in any easily accessible position, preferably under the instrument board 2 as indicated in Figs. 1 and 3. The motor or ignition lock switch is indicated at 315 and controlled in the well-known manner by a key 316. The leads to this switch are lead to the box 50 through a file and saw-proof casing 317. There is also a lead from this switch to the solenoids which lead is indicated at 318, Fig. 15. In this lead is a main cutout switch M located in the box 50 and the box is provided with a cover or closure which may be locked closed by a lock 319 preferably controlled by the ignition switch key 316, but may be controlled by another key if desired. The wiring is shown diagrammatically in Fig. 15 and it will be seen that when the key-controlled motor or ignition switch 315 is locked, all the various safety devices are locked out of operation, but as soon as the ignition switch is closed, they are again placed in operative connection. However, if it is desired not to use these automatic safety controls, the operator may unlock the terminal box 50 and open the main switch M. This will cut out all the automatic controls and will permit the car to be operated in the normal manner. This switch does not affect the ignition because the ignition lead 320 runs from the switch 315 direct and not through the switch M.

As heretofore pointed out, the power device of Fig. 4, for example, may be manually or mechanically controlled instead of electrically. Suitable control means of this character are illustrated in Fig. 34, wherein parts which correspond with parts of Fig. 4 are identified by the same numerals. As shown, valve rod 24 is connected to or is engaged by a rod 324 which extends through passage 38 and a bushing or guide sleeve 325 that is, in turn, screw threaded into the lower end of piston rod 13. Suitable packing may be provided at 326 to prevent leakage along the lower end of rod 324 while permitting longitudinal movement thereof. A bell crank lever 327 is pivotally mounted at 328 on a depending portion of casting 13 and is adapted to engage the lower end of rod 324. A light spring 329 is provided for normally holding lever 327 in engagement with rod 325, the tension of said spring being considerably less than the compression of spring 44. A Bowden wire, chain or other suitable means (not shown) may be provided for manually pivoting lever 327 in a clockwise direction, as viewed in the drawings, to thereby move valve member 24 upwardly to open valve 26 and close valve 25 for a purpose heretofore fully described. The operation of this embodiment in disengaging the clutch and controlling the engagement thereof is the same as the operation of the device of Fig. 4, except that valve 24 is manually actuated instead of electrically.

It will thus be apparent from the foregoing description that the various automatic controls may or may not be used as is found desirable and by throwing a simple switch they may be all made ineffective, permitting operation of the car in a normal manner. However, with the use of these various safety devices, various important safeguards are provided which will greatly reduce likelihood of accidents and greatly increase the safety of the operation of the car, and due to the automatic control of the clutch engagement, as described, expert operation of the car is greatly simplified, wear and tear on the mechanism is greatly reduced and the passengers are much less fatigued. It will, of course, be understood that when these various safety devices are used they are all connected to the same power release and clutch control device as indicated diagrammatically by solenoid 21 in Fig. 15. Or any of them may also independently control the throttle through the solenoid 216. It is also, of course, not necessary to always use all of these devices on one car as various operators or car builders may like to use certain of them to the exclusion of others, while other operators or builders would prefer others. They may, however, all be used on the same car if desired as indicated diagrammatically in Fig. 15.

Having thus described my invention, what is claimed is:

1. In a clutch control device for motor vehicles, a power device connected to the clutch and capable of releasing it, a control device for the power device to cause it to function to release the clutch, and automatic means controlled by movement of the clutch to irregularly control said power device for varying the resistance of the latter to the engaging movement of the clutch.

2. In a clutch control device for motor vehicles, a suction operated power device connected to the clutch and capable of releasing it, means for connecting the power device with the intake manifold of the motor, means for controlling said connection, and means operated by movement of the clutch to control engagement of the clutch by automatically controlling the degree of vacuum in the power device.

3. In a clutch control device for motor vehicles, a suction operated power device connected to the clutch and capable of releasing it, means for connecting the power device with the intake manifold of the motor, and means for controlling said connecting means, said power device comprising means for varying the resistance to the engaging movement of the clutch.

4. In a clutch control device for motor vehicles including a spring tending to cause engagement of the clutch, means for automatically controlling engagement of the clutch comprising relatively movable piston and cylinder members, means for connecting one of said members with the clutch, a connecting passage from the interior of the cylinder to the atmosphere, and means operated by movement of the clutch for controlling said passage to control the degree of vacuum in said cylinder and thus control resistance to movement of the clutch under action of the spring.

5. In a clutch control device for motor vehicles including a spring tending to cause engagement of the clutch, means for automatically controlling engagement of the clutch comprising relatively movable piston and cylinder members, means for connecting one of said members with the clutch, a connecting passage from the interior of the cylinder to the atmosphere, a valve for controlling said passage, and means operated by relative movement of the said members to control said valve for varying the degree of vacuum in said cylinder during the engaging movement of the clutch.

6. In a clutch control device for motor vehicles including a spring tending to cause engagement of the clutch, means for automatically controlling engagement of the clutch comprising relatively movable piston and cylinder members, means for connecting one of said members with the clutch, a connecting passage from the interior of the cylinder to the atmosphere, a valve for controlling said passage, a cam connected to one of the relatively movable members, and means connected to the other member and cooperating with the cam to control said valve.

7. In a clutch control device for motor vehicles, a power device comprising relatively movable piston and cylinder members, means for connecting one of said members to the clutch, a connecting passage from the interior of the cylinder to a source of suction, a connecting passage from the interior of the cylinder to the atmosphere, valves for controlling said passages, electrical means for controlling said valves, control means for said electrical means, another valve for controlling the connection with the atmosphere, and an automatic control for the latter valve operated by relative movement of the piston and cylinder members.

8. In a motor vehicle having a control device, a suction operated power device connected to said control device directly, a conduit connecting said power device with the intake manifold of the motor, a valve for controlling said conduit, control means for said valve, a non-return check valve in the connection between the power device and the manifold, and means controlled by movement of the power device for connecting the power device with the atmosphere.

9. In a motor vehicle having a control device, a suction operated power device comprising relatively movable piston and cylinder members, means for connecting one of said members to the control device, a conduit connecting the interior of the cylinder with the intake manifold of the motor, a valve for controlling said conduit, control means for said valve, a non-return check valve in the connection between the cylinder and the manifold, and means controlled by movement of the control device for placing the interior of the cylinder in communication with the atmosphere.

10. In a motor vehicle having a control device, a piston, means for connecting the piston to a support, a movable cylinder enclosing the piston, means for connecting the cylinder to the control device, a conduit for connecting the interior of the cylinder with the intake manifold of the motor, a passage forming communication from the interior of the cylinder to the atmosphere, valves for controlling the conduit and passage, control means for said valves, and means controlled by movement of the cylinder for controlling communication of the interior of the cylinder with the atmosphere.

11. In a clutch control device for motor vehicles, a piston, means for connecting the piston to a support, a movable cylinder enclosing the piston, means for connecting the cylinder to the clutch, a conduit for connecting the interior of the cylinder with the intake manifold of the motor, a passage forming a communication from the interior of the cylinder to the atmosphere, valves for controlling said conduit and passage, control means for said valves, a second valve for controlling the passage, and cam operated means controlled by relative movement of the piston and cylinder for controlling the latter valve.

12. In a clutch control device for motor vehicles, relatively movable piston and cylinder members, means for connecting one of said members to the clutch, a conduit connecting the interior of the cylinder with the intake manifold of the motor, a passage connecting the interior of the cylinder with the atmosphere, valves for controlling said conduit and passage, control means for said valves, a second passage leading from the first passage to the atmosphere, a restricting valve in the second passage, valves for controlling the communication of each passage with the atmosphere, a cam associated with each of the latter valves for controlling it and connected to one of said members, and means on the other member to cooperate with said cams on relative movement of said members to control opening and closing of said latter valves.

13. In a clutch control device for motor vehicles, relatively movable piston and cylinder members, means for connecting one of said members to the clutch, a conduit connecting the interior of the cylinder with the intake manifold of the motor, a passage connecting the interior of the cylinder with the atmosphere, valves in the piston for controlling said conduit and passage in opposite relation, a solenoid in the piston for simultaneously operating said valves, control means for said solenoid, a branch passage from the first passage also leading to the atmosphere, a restricting means in said branch passage, a restricted connection from the first passage to the atmosphere, valves for controlling the communication of the passages with the atmosphere one for each passage, a cam for controlling each of the last-mentioned valves, means for mounting the cams on one of said members, and fingers on the other member cooperating with the respective cams to control said last-mentioned valves upon relative movement of the cylinder and piston.

14. In a motor vehicle having a clutch and a brake, a suction operated power device connected with said clutch, a conduit for connecting said power device with the intake manifold of the motor, a valve for controlling said conduit, an electrical control for said valve, an electric circuit including said control for the valve, a switch in said circuit so connected with the brake mechanism as to be closed when the brake is applied, and open said valve to cause the suction to release the clutch, and means operated by movement of the power device to automatically control engaging movement of the clutch when the circuit is broken by releasing the brake.

15. In a motor vehicle having a clutch and a brake lever, a suction operated power device connected with said clutch and capable of releasing it, means for connecting the power device with the intake manifold of the motor, an electrically controlled valve in said connection, a switch for said electrical control, means for so connecting said switch to the brake lever that the switch is open when the brake is released and is closed when the brake is applied to cause the power device to release the clutch, and means associated with the power device to automatically control the engaging movement of the clutch when the brake is released.

16. In a motor vehicle having a clutch and a brake, means for applying said brake, a power device connected to the clutch and capable of releasing it, a control for the power device connected to the brake applying means to cause release of the clutch when the brake is applied, and means for automatically controlling engaging movement of the clutch when the brake is released.

17. In a motor vehicle having a clutch and a brake, an operating lever for said brake, a suction operated power device connected to said clutch, a conduit connecting the power device with the intake manifold of the motor, a control valve for said conduit, an electrically operated device for controlling the valve, a switch for controlling said electrically operated device connected to the brake lever, said switch being arranged to close the circuit and cause release of the clutch when the brake is applied and to open the circuit to cause engagement of the clutch when the brake is released, a hand operated switch on said lever for opening the circuit to cause engagement of the clutch at the will of the operator, and means associated with the power device to automatically control engaging movement of the clutch.

18. In a motor vehicle having a clutch and a brake, an operating lever for said brake, a suction operated power device connected to said clutch, a conduit connecting the power device with the intake manifold of the motor, a control valve for said conduit, an electrically operated device for controlling the valve, a switch for controlling said device connected to the brake lever, said switch being arranged to close the circuit and cause release of the clutch when the brake is applied and to open the circuit to cause engagement of the clutch when the brake is released, a second switch in the circuit, an automatic control for the second switch to keep it normally closed when the car is on a level or an upgrade and to automatically open the switch to permit engagement of the clutch when the car is on a down grade, and means associated with the power device to automatically control engaging movement of the clutch.

19. In a motor vehicle having a clutch and a brake, an operating lever for said brake, a power device connected to the clutch and capable of releasing it, a control for said power device connected to said lever and arranged to cause the power device to function to release the clutch when the brake is applied and to permit engagement of the clutch when the brake is released, and means to permit engagement of the clutch independently of the brake lever when the car is on a down grade.

20. In a clutch control device for motor vehicles, a pedal for operating the clutch, a suction operated power device connected to the pedal and capable of depressing the pedal to release the clutch, a connection from the power device to the intake manifold of the motor, means for controlling said connection, and means to control engaging movement of the clutch by automatically controlling the degree of vacuum in the power device including an inlet connection to the power device from the atmosphere, a valve for controlling said inlet connection, and means operated by movement of the pedal to control said valve mounted to open said valve to permit free movement of the clutch up to the point where it begins to engage, then close the valve to retard movement of the clutch until engaged, and then opening the valve to permit free movement of the pedal after the clutch is engaged.

21. In a power clutch control device for motor vehicles, a fluid operated power actuator embodying relatively movable members forming a fluid pressure chamber, one of said members being connected to the clutch for effecting disengaging movement thereof, means for controlling the operation of the power actuator to disengage the clutch, and means independent of said first-mentioned means and connected to one of said relatively movable members to be operated thereby for automatically controlling the fluid pressure within the power actuator to effect an irregular engaging movement of said clutch.

22. In a vacuum-operated power clutch control device for motor vehicles, a power actuator including relatively movable members forming a chamber, one of said members being connected to the clutch for effecting disengaging movement thereof, means for creating a sub-atmospheric pressure in said chamber to disengage the clutch, and means operable by relative movement between said relatively movable actuator members for automatically controlling the fluid pressure in said power actuator to effect a non-uniform rate of movement of the actuator member connected to the clutch throughout at least a portion of its travel during clutch engagement.

23. In a pressure differential operated power clutch control device for motor vehicles, a power actuator including a pair of relatively movable members, one of said members being connected to the clutch for effecting disengaging movement thereof, means for controlling the operation of the actuator to disengage the clutch, and means interposed between said relatively movable members for automatically controlling said power actuator to effect an irregular engaging movement of said clutch.

24. In automatic clutch operating mechanism for automobiles, a source of vacuum, a vacuum cylinder and piston mechanism provided with means for vacuum connection and for air relief, and means for controlling the air relief associated with said cylinder and piston mechanism to afford relatively unrestricted relief during the first part of a stroke of the piston followed by relatively restricted relief.

25. In an automobile having a clutch, power mechanism of the pneumatic type associated with mechanism for operating said clutch, a control valve to said power mechanism, a variable port to said control valve, so that the speed with which engagement of the clutch takes place may be regulated, and means associated with said clutch operating mechanism for reducing said variable port just prior to final engagement of said clutch.

26. Apparatus of the character described comprising a fluid pressure power device having means responsive to differential pressure therein connected to the operating member of a motor vehicle clutch having a normal bias to operative position, and valve means including a control valve mechanism operative to one position for establishing differential pressure in said power device and to another position for releasing said power device to permit the clutch to return to normal position and valve mechanism provided with a port controlled by the differential pressure responsive means of said power device and operative thereby for retarding movement of the clutch elements as they approach operative position.

27. In an automobile with its clutch, the combination of a clutch actuator and mechanism for automatically operating said clutch actuator, said mechanism including a power device having manually controllable valve means for effecting quick movement of the actuator for the first portion of its movement in the direction of clutch engagement followed by slow movement of the actuator in the direction of clutch engagement, whereby smooth clutch engagement is afforded.

28. In an automobile with its clutch, the combination of a clutch actuator and mechanism for automatically operating said clutch actuator, said mechanism including a power device having valve means for effecting quick movement of the actuator for the first portion of its movement in the direction of clutch engagement followed by slow movement of the actuator in the direction of clutch engagement, and means movable with said clutch actuator for effecting such operation of the valve means.

29. In automobile clutch control mechanism, the combination with a clutch control member, of a pneumatically operated power unit comprising a cylinder and piston, means operatively connecting said piston with said clutch control member, means for transmitting suction from the automobile intake manifold to said cylinder for causing movement of said piston in one direction, and means for automatically varying the fluid pressure in said cylinder to retard the motion of said piston at one point in its stroke in one direction for securing a gradual engagement of the clutch.

30. In a clutch control device for a motor vehicle provided with a clutch and an intake manifold, a suction operated power device comprising a pressure differential operated motor including fixed and movable members defining a suction chamber, means interconnecting said movable member and clutch, a fluid transmitting connection interconnecting said chamber and intake manifold, valve means for controlling said latter connection to alternately interconnect the chamber with the manifold and atmosphere to initiate the disengagement and engagement of the clutch, and other valve means operable in accordance with relative movement of said fixed and movable members for controlling the connection between said chamber and atmosphere to control the engaging movement of the clutch.

31. In an automobile clutch control mechanism, the combination with a clutch control member, of a pneumatically operated power unit comprising a cylinder and piston, the latter being operatively connected with the clutch control member, valve means for initiating clutch disengaging and engaging operations of said power unit, and other valve means operative to so control the clutch engaging operation of said unit as to effect, in succession, relatively fast, slow, then fast clutch engaging movement of said clutch control member.

32. In a vacuum operated power clutch control device for motor vehicles, a power actuator including relatively movable members, one of said members being connected to the clutch to be operated, and valvular means for controlling the clutch disengaging and engaging operations of the actuator, said means including a ball member operative to control the clutch engaging operation of the actuator.

33. In an automotive vehicle provided with an internal-combustion engine and a clutch, an engine operated power means for operating said clutch, and means for controlling the operation of said power means, including successively operable power operated valves for controlling the clutch engaging operation of said engine operated means.

34. In a vacuum operated clutch control mechanism for an automotive vehicle having an internal-combustion engine and a clutch, said mechanism including a fluid motor, connections between said motor and clutch and fluid transmitting connections between the intake manifold of said engine, said motor, and the atmosphere, said latter connections including a three-way control valve for said motor and further including a plurality of successively operable valves for controlling the mode of engagement of the clutch.

35. In an automotive vehicle provided with a clutch comprising driving and driven members, fluid pressure operated power means for disengaging the clutch and controlling the engagement thereof, said power means comprising a valve automatically operable, when the driving and driven members of the clutch contact one with another, to vary the fluid pressure within said power means to thereby decrease the rate of engagement of the clutch.

36. In an automotive vehicle provided with an internal combustion engine and a clutch actuating member, pressure differential operated means for operating said clutch actuating member comprising a motor operably connected to the clutch, a fluid transmitting connection interconnecting one end of said motor with the engine, and valve means for controlling the flow of power fluid to and from said motor, said valve means comprising means operable to alternately open and close the fluid transmitting connection to initiate the clutch engaging and disengaging operations of said motor, and further comprising other means operative to so control the pressure of the power fluid within said motor as to effect a relatively rapid first stage of engaging movement of the clutch, and further operative to automatically appreciably change the pressure of the power fluid within said motor when the friction elements of the clutch contact one with the other.

37. In an automotive vehicle provided with an engine, a transmission, and a clutch for interconnecting the two to drive the vehicle, said clutch comprising driving and driven members, vacuum operated power means for operating said clutch, and means for progressively varying the clutch engaging operation of said power means in accordance with the engaging movement of one of said clutch members.

38. In a vacuum operated power clutch control device for motor vehicles, a power actuator including relatively movable members forming a fluid pressure chamber, one of said members being connected to the clutch for effecting disengaging movement thereof, means for creating sub-atmospheric pressure in said chamber to disengage the clutch, and means independent of said first-named means and operable by one of said relatively movable members for automatically controlling the fluid pressure within said power actuator to effect an irregular engaging movement of said clutch.

39. In a clutch control device for motor vehicles, a power device connected to the clutch and capable of releasing it, a control device for the power device to cause it to function to release the clutch, and control means for said power device for varying the resistance of the latter to the engaging movement of the clutch.

40. In a clutch control device for motor vehicles, a fluid pressure operated power device connected to the clutch and capable of releasing it, means for connecting the power device to a source of sub-atmospheric pressure, means for controlling said connection, and means for controlling the degree of vacuum in the power device during the engaging movement of the clutch.

41. In apparatus of the class described, a movable member, resilient means associated with said member, a power device connected to said member for moving the latter in one direction in opposition to said resilient means and capable of releasing it for movement in the other direction by said resilient means, means for connecting the power device to a source of sub-atmospheric pressure, means for controlling said connecting means, and control means for said power device for varying the resistance of the latter to the return movement of said member by said resilient means.

42. In apparatus of the class described, a movable element, resilient means tending to move said element in one direction, means for controlling the movement of said element by said resilient means comprising a pair of relatively movable members forming a fluid pressure chamber, means for connecting one of said members with said element, a connecting passage from the interior of said chamber to the atmosphere, and means for controlling the flow of air through said passage including a cam operatively associated with one of said relatively movable members.

43. In apparatus of the class described, a control device, a fluid pressure operated power device connected to said control device, means connecting said power device with a source of sub-atmospheric pressure and with the atmosphere, valve means for controlling said connecting means, control means for said valve means, a non-return check valve in the connecting means between the power device and said source, and means controlled by the movement of an element of the power device for controlling the connecting means between the power device and the atmosphere.

44. In a motor vehicle having an engine, a clutch and a brake pedal, the combination therewith of a suction actuated motor connected for disengaging the clutch, a source of suction, and a valve controlling communication between the latter and said suction motor, together with an electrically actuated device connected to said valve for opening it, and a foot-operated control switch for said electrical device mounted on the brake pedal, said control switch comprising a lever fulcrumed on the brake pedal and projecting above the upper surface of said pedal in a position to be actuated by the same foot as that which the driver uses to operate said brake pedal.

45. In a motor vehicle having a clutch and a pedal-controlled device, a fluid pressure actuated motor connected for disengaging the clutch, a source of suction, means connecting said source and motor, a valve controlling said connection, an electrically actuated device connected to said valve for actuating the same, and a foot-operable control switch for said electrical device mounted on said pedal.

46. In an automotive vehicle having a transmission and means for operating the latter, the combination of a control device, a fluid pressure actuated motor for actuating said device, a source of suction, means connecting said motor to said source and to atmosphere, valve means controlling said connecting means, electro-magnetic means for actuating said valve means, and switch means operable by said transmission operating means for controlling said electro-magnetic means.

47. In a motor vehicle having a clutch, a fluid pressure operated power device connected to the clutch and capable of operating the same, said power device comprising relatively movable piston and cylinder members, a source of suction, means connecting the interior of the cylinder to said source for disengaging the clutch, a piston rod connected to said piston and extending exteriorly of the cylinder, said piston rod having a bore therethrough adapted to afford communication between the interior of said cylinder and the atmosphere, valve means for controlling the flow of air through said bore, and means for controlling said valve to vary the fluid pressure within said cylinder during the engaging movement of the clutch for varying said movement.

48. In a clutch control device for motor vehicles including a spring tending to cause engagement of the clutch, means for controlling the engaging movement of the clutch comprising relatively movable piston and cylinder members, means for connecting one of said members with the clutch, a piston rod secured to said piston and extending exteriorly of the cylinder, a connecting passage from the interior of the cylinder to the atmosphere, said passage including a bore in said piston rod, valve means for controlling said passage, and means for controlling said valve means to vary the fluid pressure within said cylinder to vary the engaging movement of the clutch.

49. Apparatus of the character described comprising a power device operatively connected to an operating member for a motor vehicle clutch, a control device for effecting actuation of said power device to disengage the clutch and to release the clutch elements for return movement toward engaged position, and means operative when the clutch elements reach an intermediate position for retarding the movement of the clutch elements and operative for releasing said operating member for more rapid movement in clutch engaging direction after the same has been retarded.

50. Apparatus of the character described comprising a power device operatively connected to a motor vehicle clutch, a control device for effecting actuation of said power device to disengage the clutch and to release the clutch elements for return movement toward engaged position, and means operative when the clutch elements reach an intermediate position for increasing the resistance of the power device to the engaging movement of the clutch.

51. Apparatus of the character described comprising a power device operatively connected to a motor vehicle clutch, a control device for effecting actuation of said power device to disengage the clutch and to release the clutch elements for return movement toward engaged position, and means operative when the elements of the clutch reach an intermediate position substantially at the point of initial engagement for retarding the movement of the clutch elements, said last-named means including means for varying the pressure in said power device.

52. In an automotive vehicle provided with a clutch, power means for operating said clutch comprising a vacuum operated motor, the power element of which is operably connected with the clutch, valve means operable to initiate the clutch disengaging and engaging operations of said motor, and other valve means operative to effect a variable clutch engaging operation of said motor.

53. In automatic clutch operating apparatus for automobiles, a clutch actuator, a source of vacuum, a vacuum cylinder and piston mechanism provided with means for vacuum connection and for air relief, said mechanism having port means effecting quick movement of the actuator for the first portion of its movement in the direction of clutch engagement and slow movement of the actuator in the remaining portion of its movement in the direction of clutch engagement whereby smooth clutch engagement is afforded.

54. The combination with the brake and clutch mechanisms of a motor vehicle of means for operating the brake mechanism, means for operating the clutch mechanism, a gravity controlled member, and means controlled jointly by said brake operating means and said gravity controlled member for controlling the clutch operating means.

55. The combination with the brake and clutch mechanisms of a motor vehicle of operating means for the brake mechanism, operating means for the clutch mechanism, gravity means, and means jointly controlled by one of said operating means and said gravity means for controlling the other of said operating means.

56. In a motor vehicle having a clutch, the combination therewith of a fluid pressure operated power device connected to the clutch and capable of releasing it, a source of sub-atmospheric pressure, means for connecting the power device with said source, valve means in said connecting means for controlling fluid flow therein, and means for controlling said valve means including a ball supported on and free to roll along a surface which is inclined to the horizontal when the vehicle is on a horizontal surface.

57. In an automotive vehicle, the combination of a control device, means including a fluid pressure system for operating said device, and means for controlling the flow of fluid in said system including a ball supported on and free to roll along a surface which is inclined to the horizontal when the vehicle is on a horizontal surface.

58. In a motor vehicle having a clutch and a brake mechanism, means for operating the clutch, means for operating the brake mechanism, one of said operating means including a fluid pressure system, valve means for controlling the flow of fluid in said system, gravity means, and means controlled jointly by the other of said operating means and said gravity means for controlling said valve means.

59. In a clutch control device for motor vehicles, a fluid pressure operated power device connected to the clutch and capable of releasing the same, and electrically controlled valve means for controlling the flow of fluid to and from said power device, said power device comprising means for varying the resistance of the same to the engaging movement of the clutch.

60. Motor vehicle control apparatus comprising a power device connected to the motor vehicle clutch, a control device for rendering the power device operative to move the clutch elements into inoperative position and for releasing the clutch elements for movement toward operative position, and means operative when the clutch elements reach approximately the point of initial engagement for determining their rate of movement into operative engagement and operative for retarding the movement of the clutch elements into operative engagement when the clutch elements are released for relatively rapid movement toward engaged position.

61. In an automotive vehicle provided with an internal combustion engine and a clutch actuating member, pressure differential operated means for operating said clutch actuating member comprising a motor operably connected to the clutch, a fluid transmitting connection interconnecting one end of said motor with the engine, and valve means for controlling the flow of power fluid to and from said motor, said valve means comprising means operable to alternately open and close the fluid transmitting connection to initiate the clutch disengaging and engaging operations of said motor, and further comprising other means operative to permit an influx of power fluid into said motor to effect a relatively rapid first stage of engaging movement of the clutch, and further operative to automatically appreciably reduce the rate of influx of power fluid to said motor when the friction elements of the clutch contact one with the other.

62. In an automotive vehicle provided, with an intake manifold and a clutch having driving and driven elements, a pressure differential operated motor operably connected with the driven element of the clutch, a fluid transmitting connection interconnecting said manifold and motor, a primary valve incorporated in said connection, a secondary valve, means for controlling the clutch engaging operation of the motor, yieldable means acting on said latter valve, means for connecting said secondary valve means with the atmosphere, and fluid transmitting means interconnecting said secondary valve with the motor, said parts being so constructed and arranged that with operation of said primary valve to initiate a clutch engaging operation of the motor, the secondary valve remains operative to admit atmosphere to the motor and effect a relatively rapid engaging movement of the driven clutch element until the driven clutch element is moved into contact with the driving clutch element, whereupon the secondary valve is automatically operated to in part close off the communication of the motor with the atmosphere and thereby effect a retardation in the clutch engaging movement of the driven clutch element.

63. Apparatus of the character described comprising a pressure responsive device connected to a motor vehicle clutch and operative for moving the clutch elements out of engagement with each other, means for supplying vacuum to said pressure responsive device to render it operative, means for at least partially releasing the vacuum acting on said pressure responsive device to release the clutch elements for movement toward operative engagement with each other, means operative upon initial contact of the clutch elements with each other for checking the motion of the clutch elements toward operative engagement, and means for releasing the clutch elements for movement into operative engagement after their movement has been checked by said last-named means.

64. In a mechanism for operating the clutch of an automotive vehicle, the combination of a pressure-differential operated motor, valve means for controlling the clutch-disengaging operations of said motor, and automatic means for so controlling the clutch-engaging operation of the motor as to sharply check further increase of pressure between the clutch surfaces whenever relatively close contact between the driving and driven elements of the clutch has occurred, whereby any period of rapid, substantially free movement of one of said elements toward the other occurring in any clutch-closing cycle is automatically terminated at the moment of such contact, however much the contact surfaces may have been worn down by use or built up by lining renewals or other adjustments.

65. Apparatus of the character described comprising a power device connected to an operating member of the motor vehicle clutch, control means operable for rendering said power device operative to move said member to clutch inoperative position and for releasing it for movement toward clutch operative position, means for controlling the latter movement comprising means connected to the aforementioned clutch operating member, operated thereby, and operable to check its clutch-engagement-producing movement, and further comprising means for controlling the completion of such movement after the same has been initially checked.

66. An apparatus of the character described comprising a power device connected to an operating member of a motor vehicle clutch, control means operable for rendering said power device operative to move the clutch to inoperative position and for releasing the clutch elements for movement toward operative position, means automatically operative as the clutch elements approach operative position for checking the movement of such elements, and control means for causing retarded movement of the clutch elements into engagement with each other.

67. Apparatus of the character described comprising a power device operatively connected to a motor vehicle clutch, a control device for effecting actuation of said power device to disengage the clutch and to release the clutch elements for return movement toward engaged position, means operative when the clutch elements reach an intermediate position for checking the movement of the clutch elements, and means operative for releasing the clutch elements for movement to engaged position after they have been checked in such intermediate position.

68. Apparatus of the character described comprising a power device operatively connected to a motor vehicle clutch, a control device for effecting actuation of the power device to disengage the clutch and to release the clutch elements for return movement toward engaged position, means operative when the clutch elements reach an intermediate position for checking the movement of the clutch elements, and means operative for releasing the clutch elements for movement to engaged position after they have been checked in such intermediate position, said last named means being operative for retarding the rate of movement of the clutch elements into engagement with each other.

CHARLES A. BREWER.

CERTIFICATE OF CORRECTION.

Patent No. 2,346,149. April 11, 1944.

CHARLES A. BREWER.

It is hereby certified that error appears in the printed specification of the above numbered patent requiring correction as follows: In the grant, line 1-2, residence of inventor, for "Noroton Heights, New York" read --Noroton Heights, Connecticut--; and in the heading to the printed specification, line 4, for "Noroton Heights, N. Y." read --Noroton Heights, Conn.--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.